US008848250B2

(12) United States Patent
Su et al.

(10) Patent No.: US 8,848,250 B2
(45) Date of Patent: Sep. 30, 2014

(54) COMPRESSION OF HALFTONED DIGITAL IMAGES

(71) Applicant: Kyocera Documents Solutions, Inc., Osaka (JP)

(72) Inventors: Dongpei Su, El Segundo, CA (US); Kendrick Wong, El Segundo, CA (US); Larry Lubman, El Segundo, CA (US); Michael M. Chang, El Segundo, CA (US); Stephen L. Schafer, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 57 days.

(21) Appl. No.: 13/658,111

(22) Filed: Oct. 23, 2012

(65) Prior Publication Data

US 2014/0111830 A1    Apr. 24, 2014

(51) Int. Cl.
| | | |
|---|---|---|
| H04N 1/405 | (2006.01) |
| H04N 1/413 | (2006.01) |
| H04N 1/21 | (2006.01) |
| H04N 1/415 | (2006.01) |
| H04N 1/41 | (2006.01) |

(52) U.S. Cl.
CPC .............. *H04N 1/415* (2013.01); *H04N 1/4105* (2013.01)
USPC ...................... 358/3.06; 358/426.13; 358/1.16

(58) Field of Classification Search
None
See application file for complete search history.

(56) References Cited

U.S. PATENT DOCUMENTS

| | | | |
|---|---|---|---|
| 3,804,975 A | | 4/1974 | Abe |
| 4,511,213 A | * | 4/1985 | Yamazaki et al. ............. 382/237 |
| 4,667,251 A | * | 5/1987 | Hasegawa ...................... 382/238 |
| 4,673,987 A | * | 6/1987 | Toyokawa ...................... 382/237 |
| 4,724,483 A | | 2/1988 | Shinada |
| 4,760,460 A | * | 7/1988 | Shimotohno ............. 358/426.01 |
| 4,766,499 A | * | 8/1988 | Inuzuka ................... 358/426.13 |
| 4,943,869 A | * | 7/1990 | Horikawa et al. ............. 382/251 |
| 4,965,677 A | * | 10/1990 | Pennebaker et al. ..... 358/426.16 |
| 4,965,843 A | * | 10/1990 | van Dorsselaer ............. 382/237 |
| 4,982,293 A | * | 1/1991 | Ishii .............................. 382/244 |

(Continued)

FOREIGN PATENT DOCUMENTS

EP    0381129 A1    8/1990

OTHER PUBLICATIONS

Salomon, David, Data Compression. The Complete Reference, Dictionary Methods, XP-002596735, Jan. 1, 1998, pp. 104-110, Springer, New York.

(Continued)

*Primary Examiner* — Scott A Rogers
(74) *Attorney, Agent, or Firm* — McDonnell Boehnen Hulbert & Berghoff LLP

(57) ABSTRACT

Based on an m×n halftone matrix and an m×n pixel block of an image, an m×n halftone version of the m×n pixel block may be determined. An n-way interleave may be performed on rows of the m×n halftone version to create an mn×1 halftone segment. The mn×1 halftone segment may be compared to one or more halftone segments in a buffer. Based on the comparison, a literal code word and a representation of the mn×1 halftone segment may be output, and the representation of the mn×1 halftone segment may be written to the buffer. Alternatively, a repeat code word and a repeat value may be output, and at least one representation of the mn×1 halftone segment may be written to the buffer.

19 Claims, 24 Drawing Sheets

(56) References Cited

U.S. PATENT DOCUMENTS

| | | | | |
|---|---|---|---|---|
| 5,121,197 | A * | 6/1992 | Yamada et al. | 358/535 |
| 5,463,703 | A * | 10/1995 | Lin | 382/251 |
| 5,684,603 | A * | 11/1997 | Katsuno et al. | 382/252 |
| 5,734,753 | A * | 3/1998 | Bunce | 382/237 |
| 5,798,718 | A | 8/1998 | Hadady | |
| 5,915,079 | A | 6/1999 | Vondran, Jr. et al. | |
| 6,201,614 | B1 * | 3/2001 | Lin | 358/3.13 |
| 6,526,172 | B1 * | 2/2003 | Arai | 382/232 |
| 6,919,825 | B2 | 7/2005 | Su et al. | |
| 7,650,040 | B2 | 1/2010 | Ghildiyal | |
| 7,844,120 | B2 * | 11/2010 | Yamamoto | 382/232 |
| 7,920,295 | B2 * | 4/2011 | Ono et al. | 358/1.9 |
| 2007/0116367 | A1 | 5/2007 | Yamamoto | |
| 2007/0201751 | A1 | 8/2007 | Wu et al. | |

OTHER PUBLICATIONS

European Search Report for App. No. EP 13189429.7, mailed Jan. 22, 2014.
"YCbCr," from Wikipedia, http://en.wikipedia.org/wiki/YCbCr accessed Jul. 31, 2012, pp. 1-5.
"JPEG," from Wikipedia, http://en.wikipedia.org/wiki/JPEG accessed Jul. 31, 2012, pp. 1-16.
"LZ77 and LZ78," from Wikipedia, http://en.wikipedia.org/wiki/LZ77_and_LZ78 accessed Oct. 24, 2012, pp. 1-4.
Anastassiou et al., "Digital Halftoning of Images," IBM J. Res. Develop., Vol. 26, No. 6, pp. 687-697 (Nov. 1982).
"Run-length endcoding," from Wikipedia, http://en.wikipedia.org/wiki/Run-length_encoding accessed Oct. 23, 2012, pp. 1-2.

* cited by examiner

FIGURE 5A

| A8 | B8 | A2 | B2 | A4 | B4 | A6 | B6 |
|----|----|----|----|----|----|----|----|
| A7 | B7 | A1 | B1 | A3 | B3 | A5 | B5 |
| A6 | B6 | A8 | B8 | A2 | B2 | A4 | B4 |
| A5 | B5 | A7 | B7 | A1 | B1 | A3 | B3 |
| A4 | B4 | A6 | B6 | A8 | B8 | A2 | B2 |
| A3 | B3 | A5 | B5 | A7 | B7 | A1 | B1 |
| A2 | B2 | A4 | B4 | A6 | B6 | A8 | B8 |
| A1 | B1 | A3 | B3 | A5 | B5 | A7 | B7 |
| A8 | B8 | A2 | B2 | A4 | B4 | A6 | B6 |
| A7 | B7 | A1 | B1 | A3 | B3 | A5 | B5 |
| A6 | B6 | A8 | B8 | A2 | B2 | A4 | B4 |
| A5 | B5 | A7 | B7 | A1 | B1 | A3 | B3 |

COMPRESSION OF HALFTONED DIGITAL IMAGES

BACKGROUND

Halftoning is a technique that simulates continuous-tone imagery through the use of dots that vary in size, shape, or spacing. These dots, of a single tone level in fundamental binary halftoning, form halftone dot patterns. The proper design of halftone dot patterns provides, via only on/off marking of a single tone level, the appearance of multiple tones and smooth shadings in halftoned images.

SUMMARY

In an example embodiment, based on an m×n halftone matrix and a first m×n pixel block of an image, a first m×n halftone version of the first m×n pixel block may be determined. An n-way interleave may be performed on rows of the first m×n halftone version of the first m×n pixel block to create a first mn×1 halftone segment. The first mn×1 halftone segment may be compared to one or more halftone segments in a first-in-first-out (FIFO) buffer. If the first mn×1 halftone segment does not match any halftone segments in the FIFO buffer, a literal code word and a representation of the first mn×1 halftone segment may be output, and the representation of the first mn×1 halftone segment may be written to the FIFO buffer. If the first mn×1 halftone segment matches a particular halftone segment in the FIFO buffer, a repeat code word and a repeat value may be output, and at least one representation of the first mn×1 halftone segment may be written to the FIFO buffer.

Additional embodiments may include a non-transitory computer-readable medium, having stored thereon program instructions that, upon execution by a computing device, cause the computing device to perform operations in accordance with the above or other example embodiments.

Further embodiments may include a computing device comprising at least one processor, data storage, and program instructions in the data storage that, upon execution by the at least one processor, cause the computing device to operate in accordance with the above or other example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 5A depicts a halftone matrix tiled over an image, according to an example embodiment.

FIG. 5B depicts a halftone matrix tiled over an image with column padding, according to an example embodiment.

FIG. 8 depicts a hexadecimal representation of part of a halftoned version of an image, according to an example embodiment.

FIG. 13 depicts operation of a history buffer, a lookahead buffer, and new segment buffer in which no match is found for segments of the lookahead buffer, according to an example embodiment.

FIG. 15 depicts operation of a history buffer, a lookahead buffer, and new segment buffer in which no match is found for segments of the lookahead buffer, according to an example embodiment.

FIG. 16 depicts operation of a history buffer, a lookahead buffer, and new segment buffer in which a match is found for one segment of the lookahead buffer, according to an example embodiment.

FIG. 17 depicts operation of a history buffer, a lookahead buffer, and new segment buffer in which a match is found for three segments of the lookahead buffer because column padding was used, according to an example embodiment.

FIG. 18 depicts operation of a history buffer, a lookahead buffer, and new segment buffer in which a match is found for all segments of the lookahead buffer and the new segment buffer, facilitating use of an extended repeat code word, according to an example embodiment.

FIGS. 19A, 19B, 19C, and 19D depict scenarios in which use of column padding results in more efficient halftoned image compression.

DETAILED DESCRIPTION OF THE DRAWINGS

Figure 1:
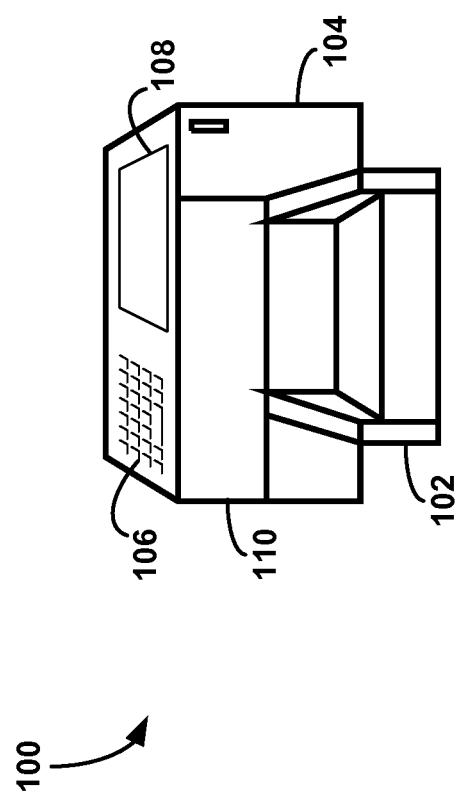
FIG. 1 depicts a printing device, according to an example embodiment.

Example methods and systems are described herein. Other example embodiments or features may further be utilized, and other changes may be made, without departing from the spirit or scope of the subject matter presented herein. In the following detailed description, reference is made to the accompanying figures, which form a part thereof.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. INTRODUCTION

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

Regardless of whether a printing device is used in a residence, a business, or in another type of location, the printing device may be a shared resource that can be communicatively coupled to various other computing devices. Consequently, in some environments, the storage requirements of a printing device may be quite high, as numerous computing devices may be transmitting electronic documents to the printing device for printing. Typically, a printing device will print, copy, fax, and/or scan one electronic document at a time, in a first-come-first-served fashion. Therefore, the printing device may store a potentially large number of electronic documents that are waiting to be serviced. Since the cost of data storage (e.g., memory such as random access memory (RAM), solid-state memory, hard-drive memory, and/or flash memory) can be expensive, it may be beneficial to compress the stored electronic documents, in order to reduce the data storage requirements of the printing device. Additionally, since some electronic documents may be transferred to and/or from the printing device and a computing device, compressing these electronic documents may make transfers faster and use less network capacity.

Moreover, since print jobs may be large (e.g., a print job may include one or more electronic documents encompassing hundreds of pages), compressing queued print jobs saves short-term storage space before each job is printed. In addition, users may want to save print jobs in long-term storage for printing at a later time. Thus, compressing print jobs may allow more print jobs to be saved. Furthermore, the act of storing and retrieving large print jobs from long-term memory can be slow, but it may be expedited by compressing the print jobs to make them smaller in size.

2. EXAMPLE PRINTING DEVICE

FIG. 1 depicts an example printing device 100. Printing device 100 may be configured to print partially-stored and/or fully-stored electronic documents on various types of physical output media. These output media include, but are not limited to, various sizes and types of paper, overhead transparencies, and so on. Printing device 100 may be interchangeably referred to as a "printer."

Printing device 100 may serve as local peripheral to a computing device, such as a personal computer, a server device, a print server, etc. In these cases, printing device 100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 100.

On the other hand, printing device 100 may include a wireline or wireless network interface, such as an Ethernet or 802.11 (Wifi) interface. So arranged, printing device 100 may serve as a printing device for any number of computing devices that can communicate with printing device 100 over a network. In some embodiments, printing device 100 may serve as both a local peripheral and a networked printer at the same time.

In order to use printing device 100, computing devices may install one or more printer drivers. These printer drivers may include software components that convert the electronic documents to be printed from various local representations stored on the computing devices to one or more representations supported by printing device 100.

Regardless, printing device 100 may be considered to be a computing device, and may carry out both printing-related and non-printing-related tasks.

As noted above, printing device 100 may also include copier, fax, and scanner functions. In some embodiments, printing device 100 may use a scanner function to facilitate copier and/or fax functions. For instance, printing device 100 may scan a physical document into an electronic format, and then print the resulting electronic document to provide a copy, and/or transmit the resulting electronic document via a telephone interface to provide a fax function.

In order to support its various functions, printing device 100 may include a document feeder/output tray 102, paper storage 104, user interface 106, scanning element 108, and chassis 110. It should be understood that printing devices may take on a wide variety of forms. Therefore printing device 100 may include more or fewer components than depicted in FIG. 1, and/or components arranged in a different fashion than depicted in FIG. 1.

Document feeder/output tray 102 may hold physical documents (e.g., a stack of one or more sheets of paper) that are to be scanned, copied or faxed. Advantageously, document feeder/output tray 102 may allow printing device 100 to automatically feed multiple physical documents for processing by printing device 100 without requiring manual invention. Document feeder/output tray 102 may also include one or more separate output trays for holding physical documents that have been processed by printing device 100. These may include physical documents that have been scanned, copied or faxed by printing device 100, as well as physical documents that have been produced by, e.g., the fax and/or copying functions of printing device 100.

Paper storage 104 may include trays and/or feeding elements for various types of physical media. For instance, paper storage 104 may include separate trays for 8½×11 inch paper, A4 paper, letterhead paper, envelopes, and so on. For any function of printing device 100 that involves outputting physical media (e.g., printing, copying, and/or receiving a fax), paper storage 104 may supply the physical media.

User interface 106 may facilitate the interaction of printing device 100 with a human or non-human user, such as to receive input from a user and to provide output to the user. Thus, user interface 106 may include input components such as a keypad, keyboard, touch-sensitive or presence-sensitive panel, joystick, microphone, still camera and/or video camera. User interface 106 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 106 may also be configured to be able to generate audible output(s), via a speaker, speaker jack, audio output port, audio output device, earphones, and/or other similar devices, now known or later developed in the future.

Scanning element 108 may be a glass panel below which a movable light source operates to scan physical media placed on top of the glass panel. Alternatively, a digital camera below the glass panel may "scan" the physical media placed on top of the glass panel by taking a picture of the physical media.

Images of scanned physical media may be stored in data storage associated with printing device 100.

Chassis 110 may include a physical housing that contains and or interconnects various components of printing device 100, such as document feeder/output tray 102, paper storage 104, user interface 106, and scanning element 108. Additionally, chassis 110 may house other components not shown in FIG. 1. For example, chassis 110 may contain one or more toner cartridges, liquid ink jets, belts, rollers, and/or power supplies. Further, chassis 110 may include communication interfaces, such as a wireline and/or wireless network interfaces, a telephony interface (e.g., a RJ45 jack), a USB interface, a BLUETOOTH® interface, a card reader port, etc.

Figure 2:
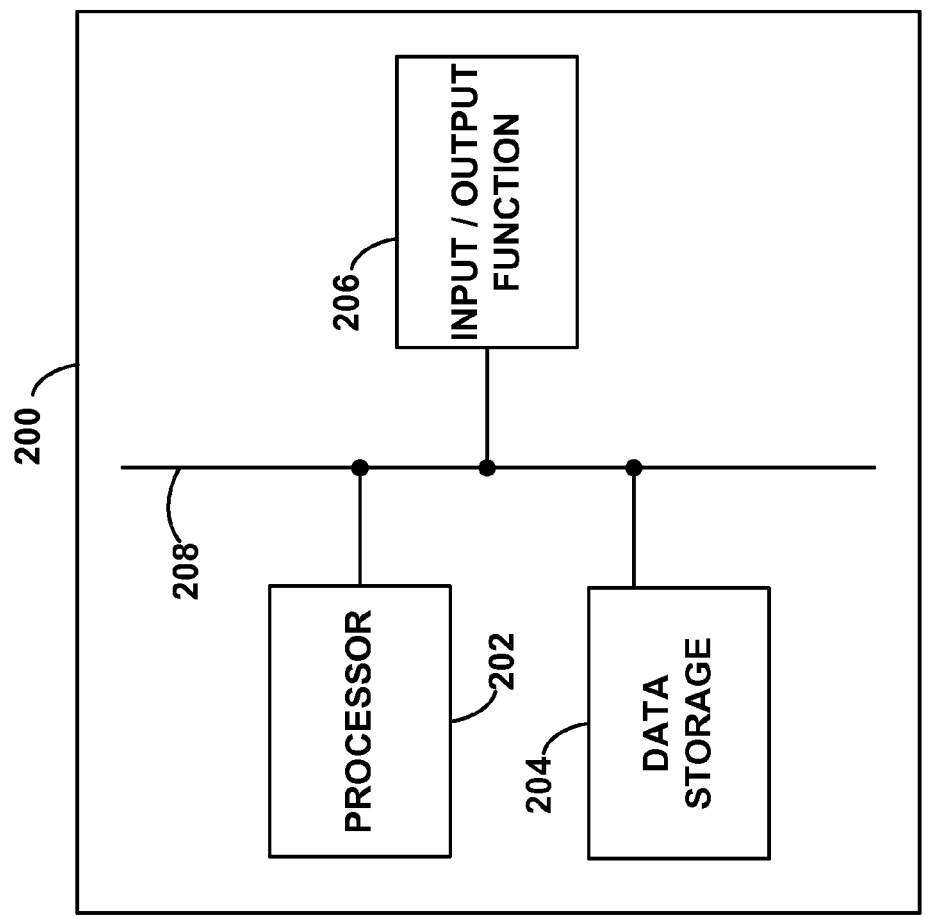
FIG. 2 is a block diagram illustrating computing components of a printing device, according to an example embodiment.

Moreover, as printing device 100 may be based on general-purpose and/or specially-designed computing device components, chassis 110 may also house some or all of these components. To that point, FIG. 2 depicts an example embodiment 200 of computing device components (e.g., functional elements of a computing device) that may be included in printing device 100.

Computing device components 200 may include a processor 202, data storage 204, and input/output function 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause printing device 100 to carry out any of the methods, processes, or functions disclosed in this specification or the accompanying drawings.

Input/output function 206 may include any of the functions and/or elements described in reference to user interface 106. Thus, input/output function 206 may serve to configure and/or control the operation of processor 202. Input/output function 206 may also provide output based on the operations performed by processor 202.

It should be understood that these examples of a printing device are provided for illustrative purposes. Further, in addition to and/or alternatively to the examples above, other combinations and/or sub-combinations of printer and computer technologies may also exist, amongst other possibilities, without departing from the scope of the embodiments herein.

Figure 3:
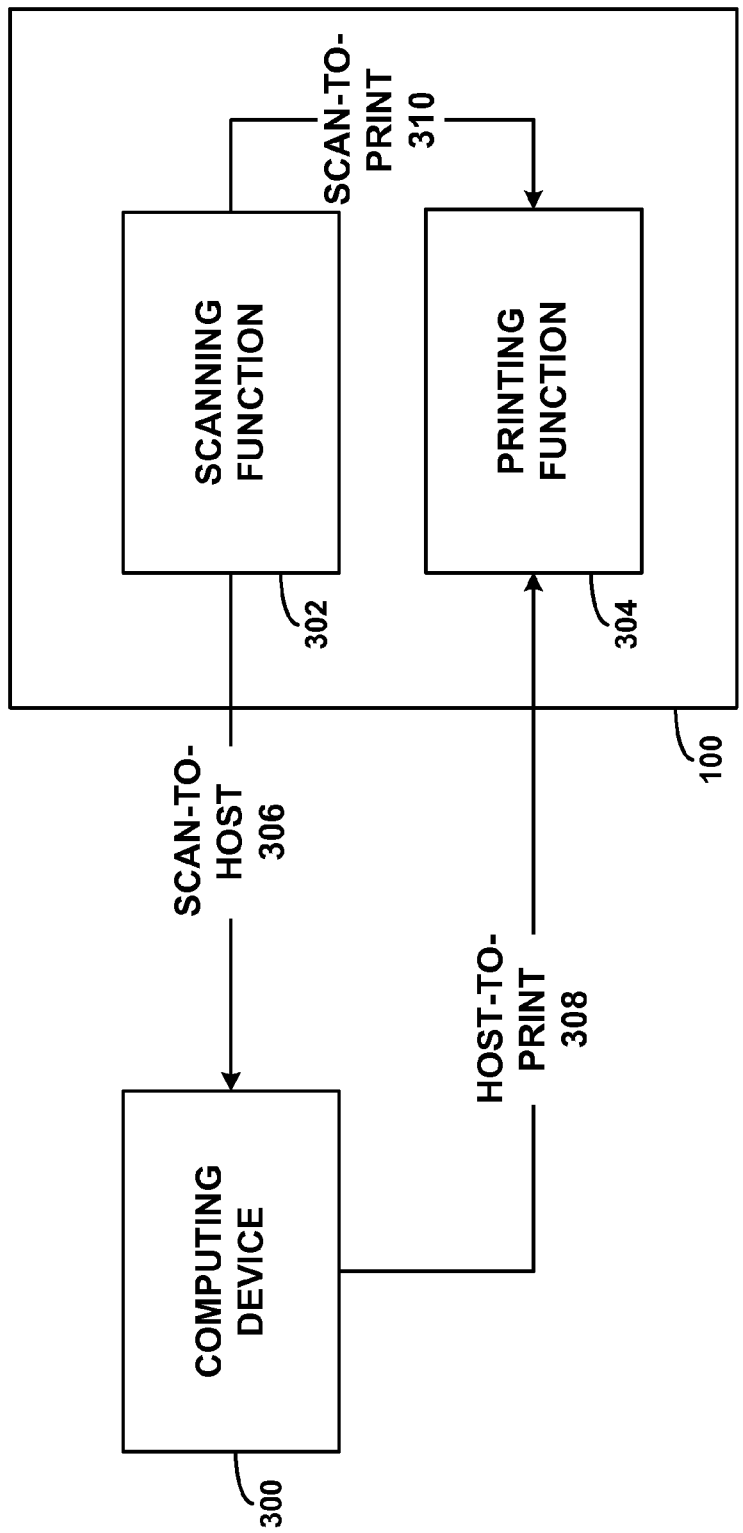
FIG. 3 is a block diagram illustrating various data paths involving a printing device, according to an example embodiment.

FIG. 3 depicts some of the possible data paths through which a representation of an electronic document processed by printing device 100 may pass. In FIG. 3 it is assumed that printing device 100 may include a scanning function 302 and a printing function 304. Each of these functions may be implemented in hardware, firmware, software, or any combination of hardware, firmware and/or software. Additionally, each of scanning function 302 and printing function 304 may communicate with computing device 300, and possibly with other computing devices as well. In some situations, the data paths supported by printing device 100 may be referred to a "pipelines."

A scan-to-print data path 310 may be supported by scanning function 302 and printing function 304. Scan-to-print data path 310 may be used, e.g., when a user instructs printing device 100 to copy a physical document. In response to this instruction, scanning function 302 may scan the physical document into an electronic document, and transmit the electronic document via scan-to-print data path 310 to printing function 304. Use of scan-to-print data path 310 may involve at least temporarily storing some or all of the electronic document in the data storage of printing device 100. Then, printing function 304 may print the electronic document to physical media (e.g., one or more sheets of paper).

A scan-to-host data path 306 may also be supported by scanning function 302 and computing device 300. Scan-to-host data path 306 may be used, e.g., when a user instructs printing device 100 to scan a physical document. The user may also instruct printing device 100 to transmit a representation of the resulting electronic document to computing device 100, or printing device 100 may be pre-configured to automatically transmit the electronic document to computing device 300. Thus, in response to this instruction, scanning function 302 may scan the physical document into an electronic document, and transmit the resulting electronic document via scan-to-host data path 306 to computing device 300. Use of scan-to-print data path 310 may involve at least temporarily storing some or all of the electronic document in the data storage of printing device 100, and transmitting a representation of the resulting electronic document to computing device 300.

A host-to-print data path 308 may be supported by computing device 300 and printing function 304. Host-to-print data path 308 may be used, e.g., when a user instructs computing device 300 to print an electronic document on printing device 100. In response to this instruction, computing device 300 may transmit a representation of the electronic document to printing function 304. Printing device 100, via printing function 304, may print the electronic document to physical media. Some or all of the electronic document may be stored in the data storage of printing device 100 before and/or during the printing of the electronic document.

Clearly, for at least one of the data paths discussed above, as well as possibly other data paths supported by printing device 100, an electronic document may require storage and/or transmission over a network or a cable. The efficiency of both the storage and/or transmission of electronic documents can be improved by compressing these electronic documents. For example, if electronic documents can, on average be compressed to one-quarter their initial size, then about four times as many electronic documents can be stored in a fixed amount of data storage. Further, the transmission of these compressed electronic documents over a network or cable can occur about four times as fast as would transmission of the uncompressed electronic documents.

The following sections describe various embodiments that provide compression of electronic documents handled by printing device 100.

3. EXAMPLE IMAGE COLOR MODELS

Electronic documents can be represented using a number of color models. Thus, a robust compression technique should be able to operate on some or all of these models. Further, halftone compression may be specific to individual color models or may operate separately on each channel of a color model.

For example, the red-green-blue (RGB) color model may be used for display of images on electronic output devices, such as televisions, monitors, and computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-channel tuple (R,G,B), each channel of which can vary from zero to a pre-defined maximum value (e.g., 255). If all of the channels are at zero, the result may be black. If all of the channels are at the maximum value, the result may be the brightest representable white.

RGB output is typically device-dependent, in that different output devices may display the same RGB image in a different fashion. Thus, in some cases, these differences may be perceivable by humans. In some embodiments, physical documents scanned into printing device 100 using scan-to-host data path 306 may be encoded using an RGB color model.

The cyan-magenta-yellow (CMY) color model may be used for the printing of color images by printing devices. CMY is a subtractive color model in which cyan, yellow, and magenta, are applied to a white surface in various ways to reproduce a spectrum of colors. For instance, red can be formed by combining magenta and yellow, blue can be formed by combining cyan and magenta, and green can be formed by combining cyan and yellow. Thus, the CMY color model might be considered as a complement of the RGB color model.

A particular pixel of a CMY image may be expressed as a three-channel tuple (C,M,Y), each channel of which can vary from zero to a pre-defined maximum value. If all of the channels are at zero, the result may be white. If all of the channels are at the maximum value, the result may be black.

Like, RGB output, CMY output is typically device-dependent, in that the printed output of the same CMY image on different printing devices may appear to be different. In some cases, these differences may be perceivable by humans. In some embodiments, electronic documents printed by printing device 100 using host-to-print data path 308 and/or scan-to-print data path 310 may be encoded using a CMY color model.

In some embodiments, a four-channel CMYK color model can also be used. This four-channel model of CMYK may be similar to or the same as the CMY color model, with the exception that a key (black) channel is also used. In addition to possibly combining cyan, magenta, and yellow to form black, the separate key (black) ink source may be used to form black. Thus, a particular pixel of a CMYK image may be expressed as a four-channel tuple (C,M,Y,K), each channel of which can vary from zero to a pre-defined maximum value.

Using the CMYK color model, the same colors as the CMY model can be supported, but less ink is typically used because the K colorant can replace mixtures of the C, M, and Y colorants. However, the CMYK color model may not always be able to be conveniently converted to and from other color models, because the addition of the K colorant adds redundancy, e.g., the same color can be a result of mixing different C, M, Y, and K combinations.

An additional color model is gray, also referred to as grayscale, which may be used for the representation of black and white images. Unlike the RGB and CMY/CMYK color models, each pixel of the gray color model is expressed using a single channel that encodes the pixel's intensity. The values used by the gray channel can vary from zero for black, to a pre-defined maximum value for white (e.g., 255). In some embodiments, one or more of the data paths supported by printing device 100 may be able to encode images using the gray color model.

Another color model is YCbCr. In some implementations, this color model may be used as an alternative representation of an image. Particularly, the Y channel may represent the brightness of a pixel, and the Cb and Cr channels may represent the blue-yellow chrominance and red-green chrominance, respectively. The YCbCr color model has a well-defined relationship with the RGB and CMY colors models and can be converted to and from either of these color models with relative ease.

An additional advantage to the YCbCr color model is that compression of images encoded using the YCbCr color model tends to be more efficient than compression of images encoded in the RGB or CMY/CMYK color models. Particularly, the human eye is not very good at detecting high-frequency (e.g., rapidly varying) chrominance information in an image. Thus, images encoded using the YCbCr color model can exploit this information by ignoring high-frequency components of the Cb and Cr channels. Thus, as discussed in more detail below, images encoded in a particular color model may be converted to the YCbCr color model before compression in order to improve compression performance.

4. EXAMPLE IMAGE HALFTONING

Many digital images contain continuous tones, in which a color or grayscale section of the image smoothly transitions from a lighter tone to a darker tone, or vice versa. However, many printers do not support continuous tones. Instead, a printer may support a discrete number of tones from the lightest tone to the darkest tone. For instance, a simple black and white printer may support only outputting either black or white for any given pixel of the image.

Halftoning includes the process of breaking down a continuous tone image into patterns of pixel shading to create the illusion of smoothly transitioning grays or colors. It should be noted that herein the term "image" may refer to a full image or part of an image, such as an image block. In some of the examples below, for sake of simplicity, operations may be illustrated on image blocks rather than full images.

A halftone matrix may be an m×n block of cells, each cell containing one or more threshold values. When applying the halftone matrix to an image, the halftone matrix may be tiled over the image, such that each pixel in the image is pairwise associated with a cell in one of the tiled halftone matrices. The halftone matrix may be defined based on the characteristics of a particular printer, and therefore may be output-device specific. Halftone matrices may also be referred to as halftone screens, threshold tables, or dither tables.

Each pixel from the image may be compared to the threshold value(s) in its associated cell to determine a halftone value for the pixel. For instance, in a particular color channel, the pixels may take on a value of 0-255, indicative of the intensity or brightness of that pixel. The associated cell may contain three threshold values, 64, 128, and 240, thus defining four ranges: 0-64, 65-128, 129-240, and 241-255. The value of the pixel falls into one of these ranges, and the range that the pixel falls in may define the halftone value of the pixel. Therefore, the halftone value of the pixel may be defined with a 2-bit value. For example, 00 may indicate the range 0-64, 01 may indicate the range 65-128, 10 may indicate the range 129-240, and 11 may indicate the range 241-255.

More formally, if there are $i-1$ thresholds defined for each cell in the halftone matrix, then these thresholds may define $i$ ranges, and the range in which a pixel value falls may be represented by a $\log_2$ (i)-bit value. Applying the halftone matrix to each pixel in the image may result in a halftone version of the image in which each pixel is represented by the $\log_2$ (i)-bit value. This halftone version may then be sent to a printer that supports i tones.

Figure 4:
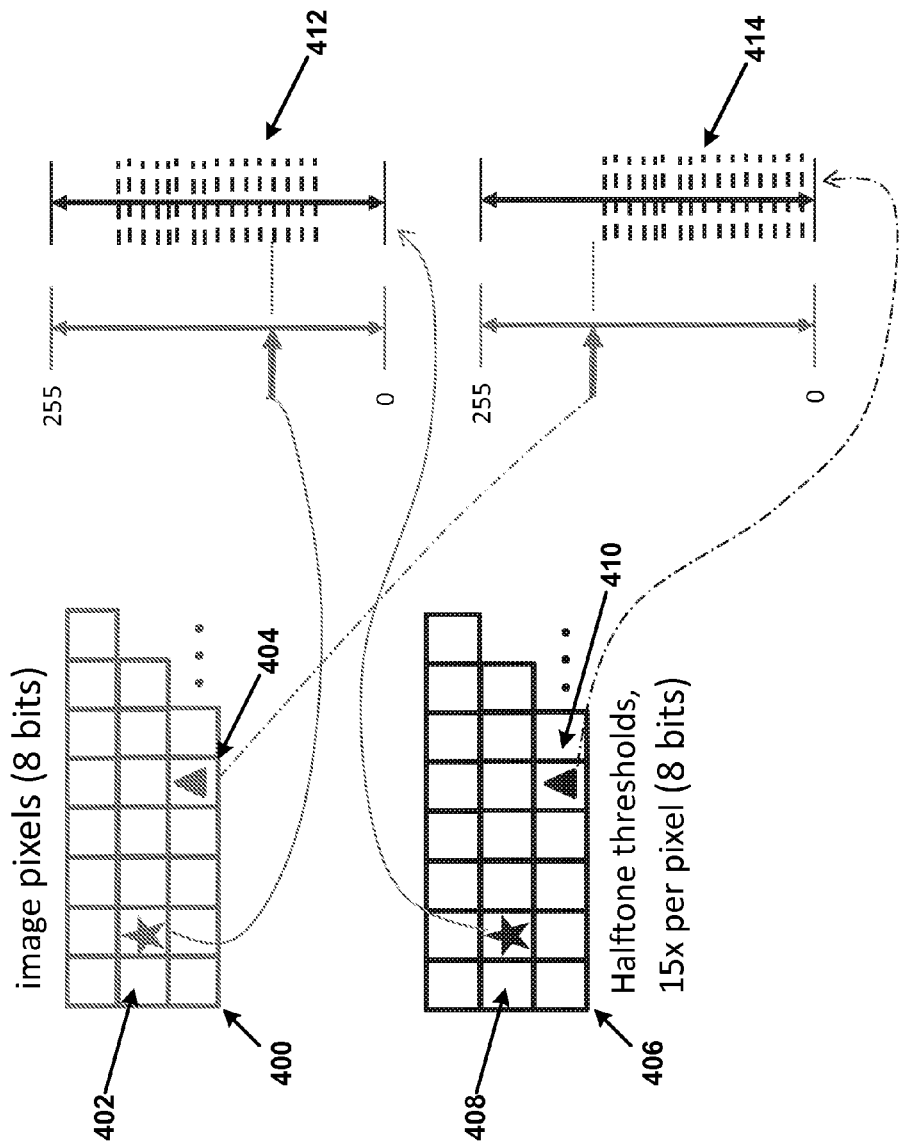
FIG. 4 depicts application of a halftone matrix to pixels of an image, according to an example embodiment.

This process is illustrated in FIG. 4. Image pixel matrix 400 contains a number of individual pixels, including example pixels 402 and 404, each taking on an 8-bit value (i.e., 0-255). Halftone matrix 406 contains a pattern of cells, including example cells 408 and 410, each including representations of 15 threshold values (i.e., indicating 16 ranges, indexed from 0 to 15, within the overall range of 0-255).

Halftone matrix 406 may be overlaid on image pixel matrix 400 such that example cell 408 is associated with example pixel 402, and example cell 410 is associated with example pixel 404. The value of example pixel 402 may be mapped to a range defined by the thresholds of example cell 408, and the value of example pixel 404 may be mapped to a range defined by the thresholds of example cell 410.

Each example cell may define different thresholds. For instance, example cell 408 may define thresholds 412, while example cell 410 may define thresholds 414. Thus, mapping the pixels to these respective thresholds may result in determining that the value of example pixel 402 falls between the fourth and fifth threshold of thresholds 412, and the value of example pixel 404 falls above the fifteenth threshold of thresholds 414. Thus, the halftone value of example pixel 402 may be represented as 4, while the halftone value of example pixel 404 may be represented as 15.

More generally, suppose that a cell of the halftone matrix defines i−1 thresholds. If the pixel value is greater than or equal to the highest threshold, the halftone value is i−1. If the pixel value is less than the lowest threshold, the halftone value is 0. If the pixel value is greater than or equal to the cth threshold but less than the (c+1)th threshold, the halftone value is c.

An example halftone matrix overlaying an example image block is depicted in FIG. 5A. Each cell of the halftone matrix is labeled as one of A1 . . . A8 or B1 . . . B8. Each of these labels indicates potentially different sets of threshold values. Thus, a cell labeled A1 may have a different set of threshold values than a cell labeled A2, and so on.

The overlay pattern of the halftone matrix is shifted left such that starting positions of vertically contiguous tiles of the halftone matrix are offset by two cells. For instance, the A1 cell of halftone matrix 502 is two cells further left than the A1 cell of halftone matrix 500. Similarly, the A1 cell of halftone matrix 504 is two cells further left than the A1 cell of halftone matrix 502. This offset may result in the halftone pattern produced by a printer having an esthetically appealing angle.

One possible disadvantage of tiling the halftone matrices is when the width of the image is such that a non-integral number of halftone matrices are required to overlay each row of the image. For instance, in FIG. 5A, the image block is 12×8 pixels, and the halftone matrix is 8×2 cells. Thus, 1½ halftone matrices are required to span the width of the image block. For reasons that will be explained in more detail below, padding the rows of the image block may lead to increased compression efficiency for the halftone version of the image. Particularly, the image block may be padded with extra columns of pixels so that an integral number of halftone matrices may be overlaid upon each row. These padding columns may contain copies of the pixels in the rightmost column of the image block.

The number of padding columns may be determined in various ways. One possible way of determining the number of padding columns, r, is according to the equation:

$$r = m - (p - q) \bmod m$$

where m is the width of the halftone matrix in cells, p is the width of the image block in pixels, and q is the offset. For FIG. 5A, m=8, p=12, and q=2. Therefore, r=6.

Figure 5B:
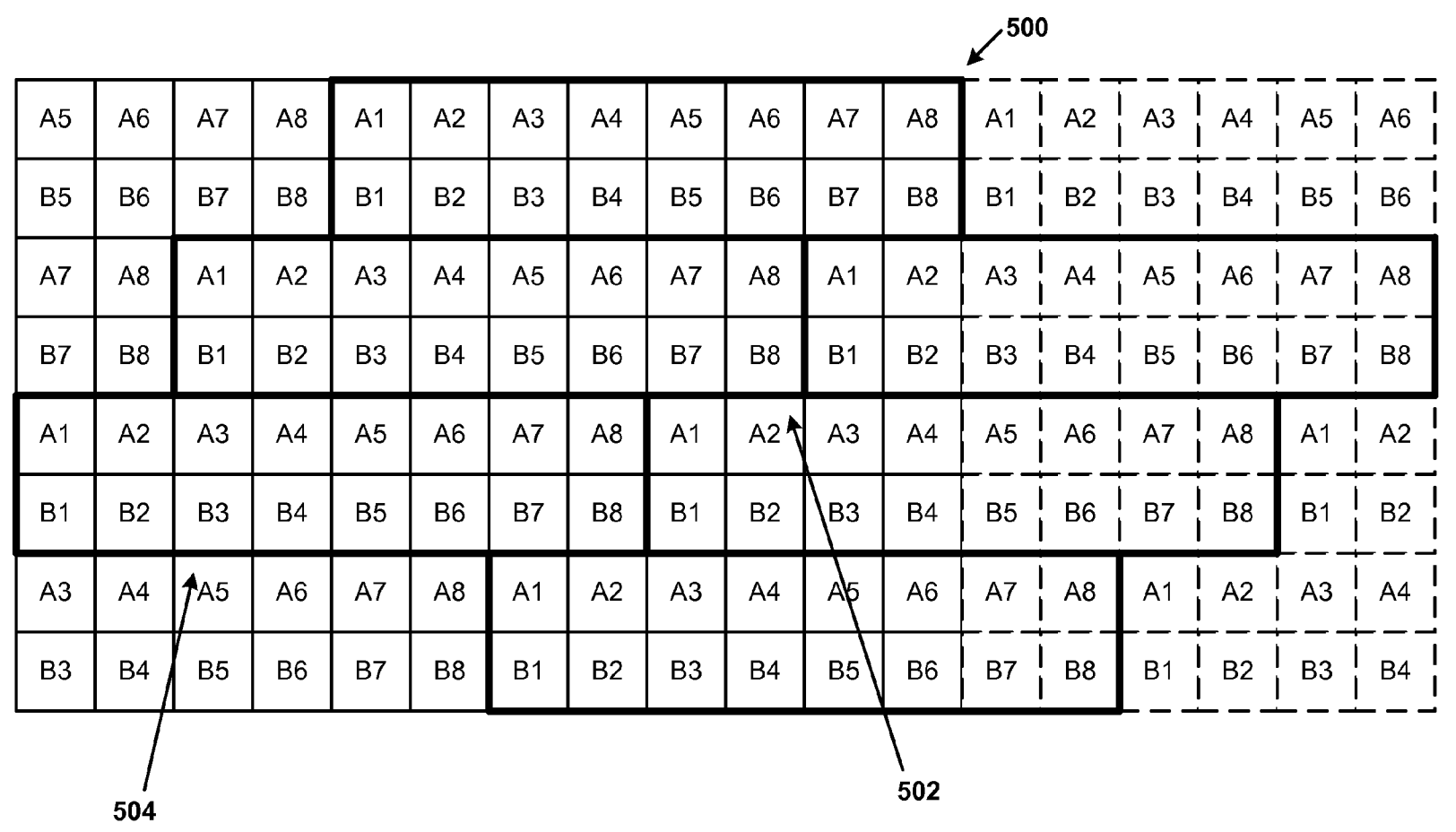

FIG. 5B depicts the image block of 5A, with 6 columns of padding, and tiled with the halftone matrix. In addition to the tiled halftone matrices shown in FIG. 5B, further halftone matrices may be tiled over the padded image block by wrapping the halftone matrix from the right end of one pair of rows to the left end of the next lower pair of rows. Thus, a halftone matrix can be laid over the A1 . . . A6 and B1 . . . B6 cells in the upper-right corner and then "wrapped around" to the A7 . . . A8 and B7 . . . B8 cells that are at the left side of the next-lowest two rows. Therefore, when each pair of rows is read contiguously left to right, the halftone matrix is repeated sequentially.

Figure 6:
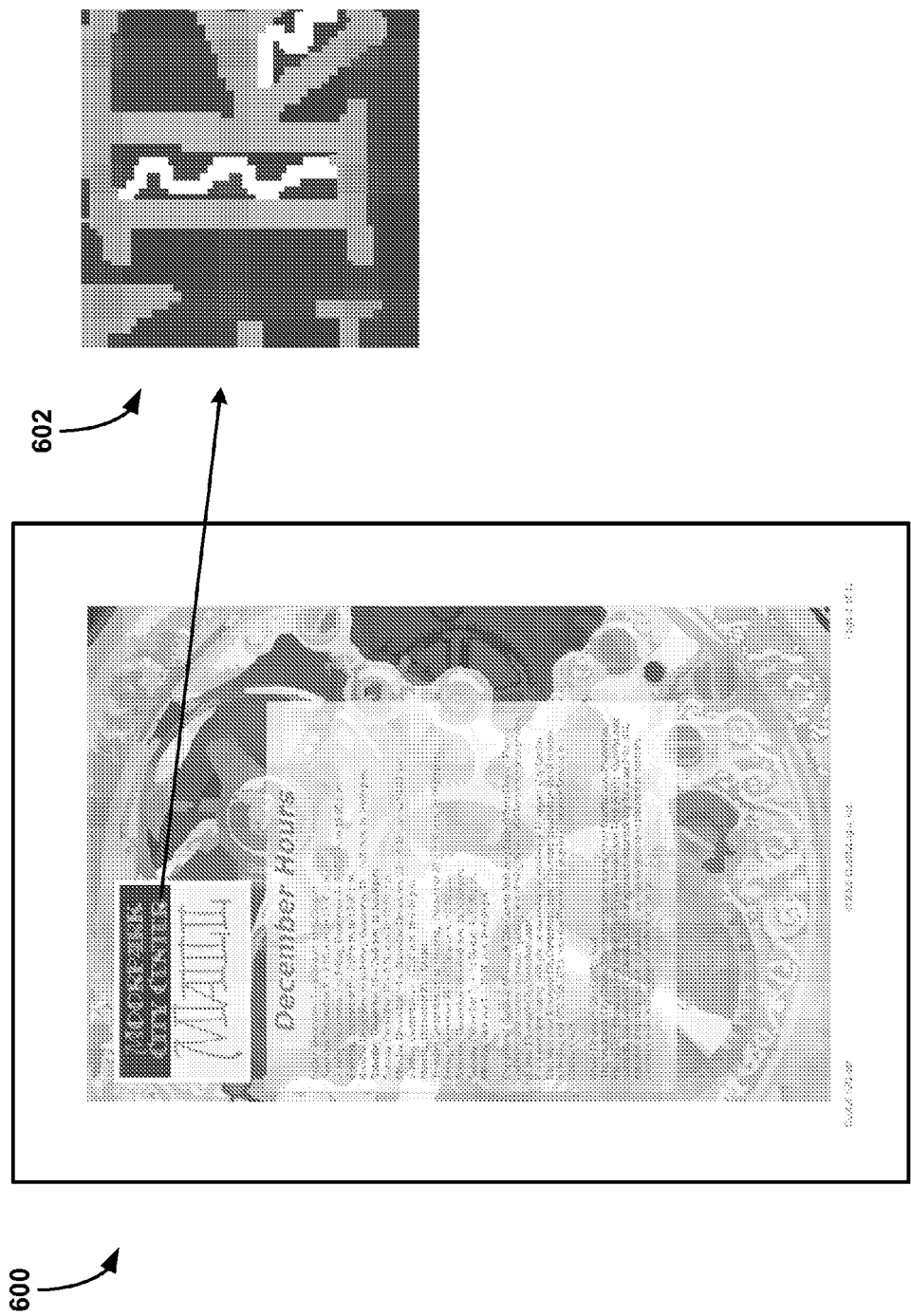
FIG. 6 depicts an image and a magnified section of the image, according to an example embodiment.

In order to provide another example based on an actual image, FIG. 6 depicts an example image 600, and an image block 602 of image 600. For purposes of simplicity and illustration, image 600 includes a single color channel. Image block 602 represents an expansion of an area of image 600—namely, the stylized "R".

As an example, it may be assumed that image block 602 is 128×128 pixels in size. Further assuming that the 8×2 halftone matrix of FIG. 5A is used to overlay image block 602, and that the offset is 2, then m=8, p=128, and q=2. Therefore, the number of padding columns, r, is 2.

Figure 7:
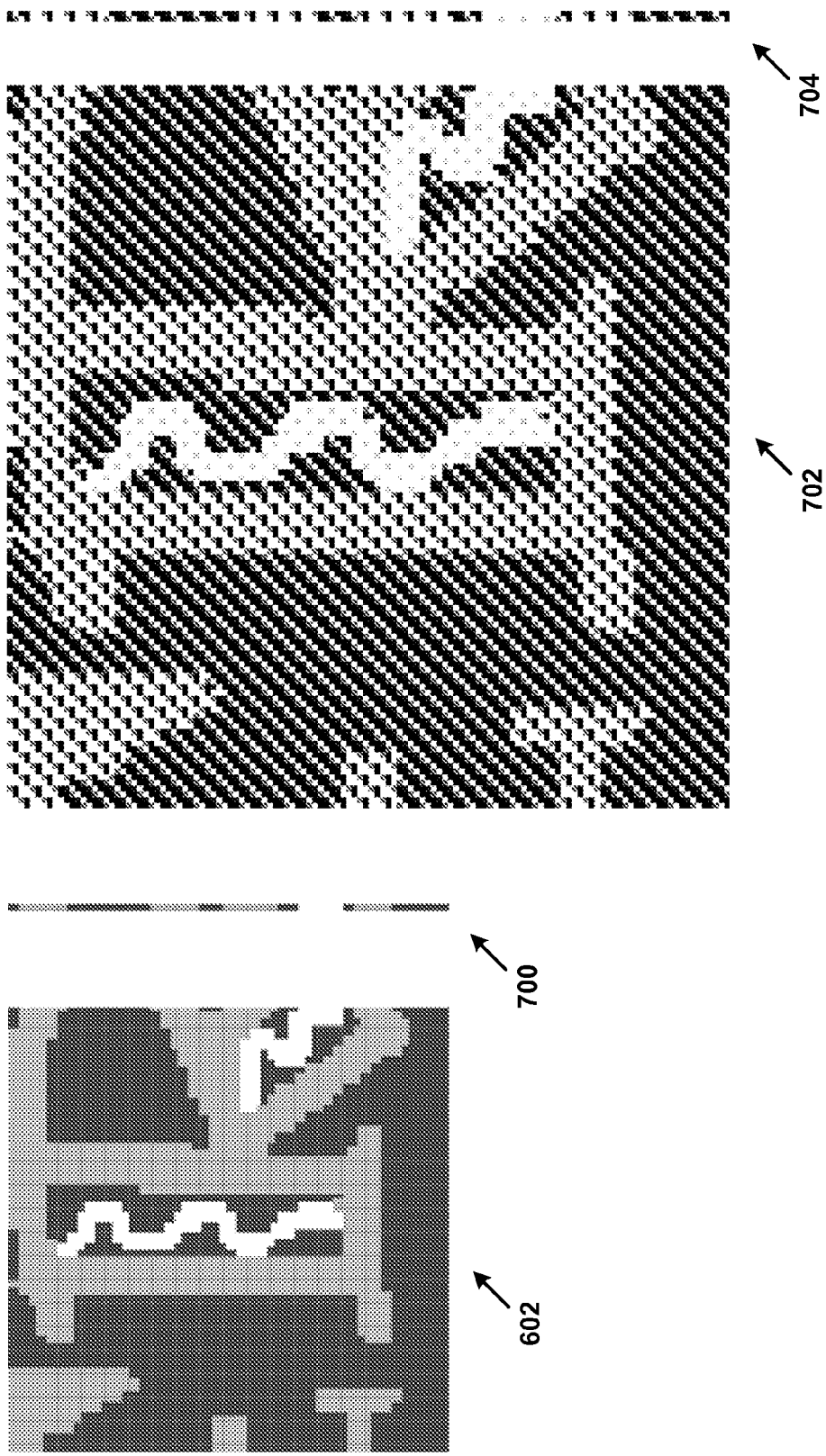
FIG. 7 depicts halftoning of an image with column padding, according to an example embodiment.

FIG. 7 depicts image block 602 again, this time aligned with a 2-pixel padding column 700. Padding column 700 may be appended to the right side of image block 602 to form a 130×128 pixel block. The pixels of padding column 700 may be derived from the two rightmost columns of image block 602, and halftoning may be applied to these pixels. Thus, after halftoning, the pixels of padding column 700 might not resemble the pixels from which they were derived.

Additionally, FIG. 7 also includes image block 702, a slightly enlarged, halftoned version of image block 602. Similarly, column 704 is a slightly enlarged, halftoned version of column 700. When viewed at an appropriate distance, image block 702 approximates the shading of image block 602. This effect may be achieved by applying an appropriate halftone matrix to image block 602.

Figure 8:
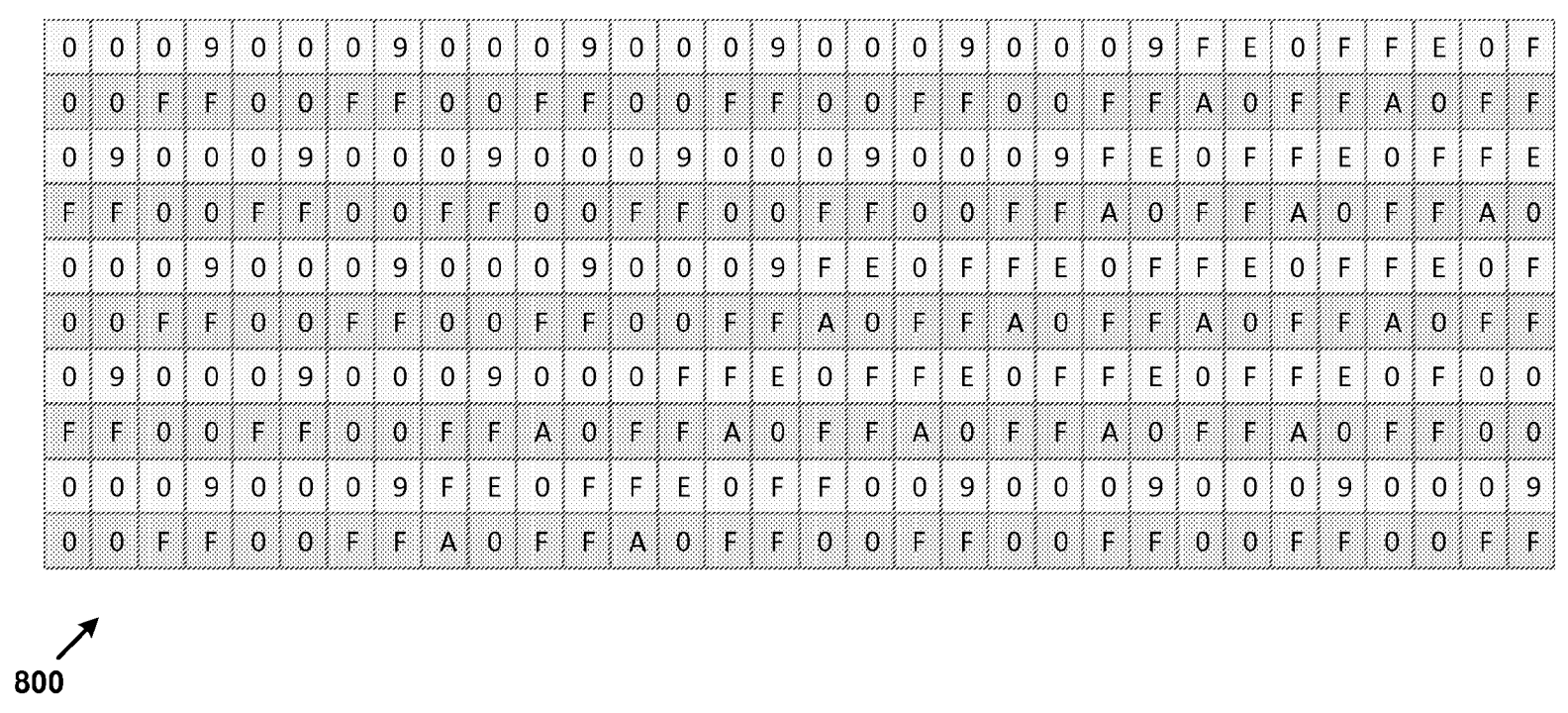

Halftoned pixels 800 in FIG. 8 depict the pixels of the upper right corner of image block 602 after halftoning is applied. Thus, halftoned pixels 800 may represent part of image block 702. In halftoned pixels 800, individual halftoned pixels may take on values from 0 through F, in hexadecimal notation. A 0 may represent the lightest halftoned pixel (e.g., white) while F may represent the darkest halftoned pixel (e.g., black). Halftone pixel values between 0 and F may represent shades of gray starting with light gray for a halftone pixel value of 1, and becoming progressively darker as the halftone pixel value increases.

Since the upper right corner of image block 602 is a solid color, the values of halftoned pixels 800 reflect the diagonal pattern evident in the upper right corner of image block 702. This illustrates how halftoning can be used to represent a particular shade of a color.

Figure 9:
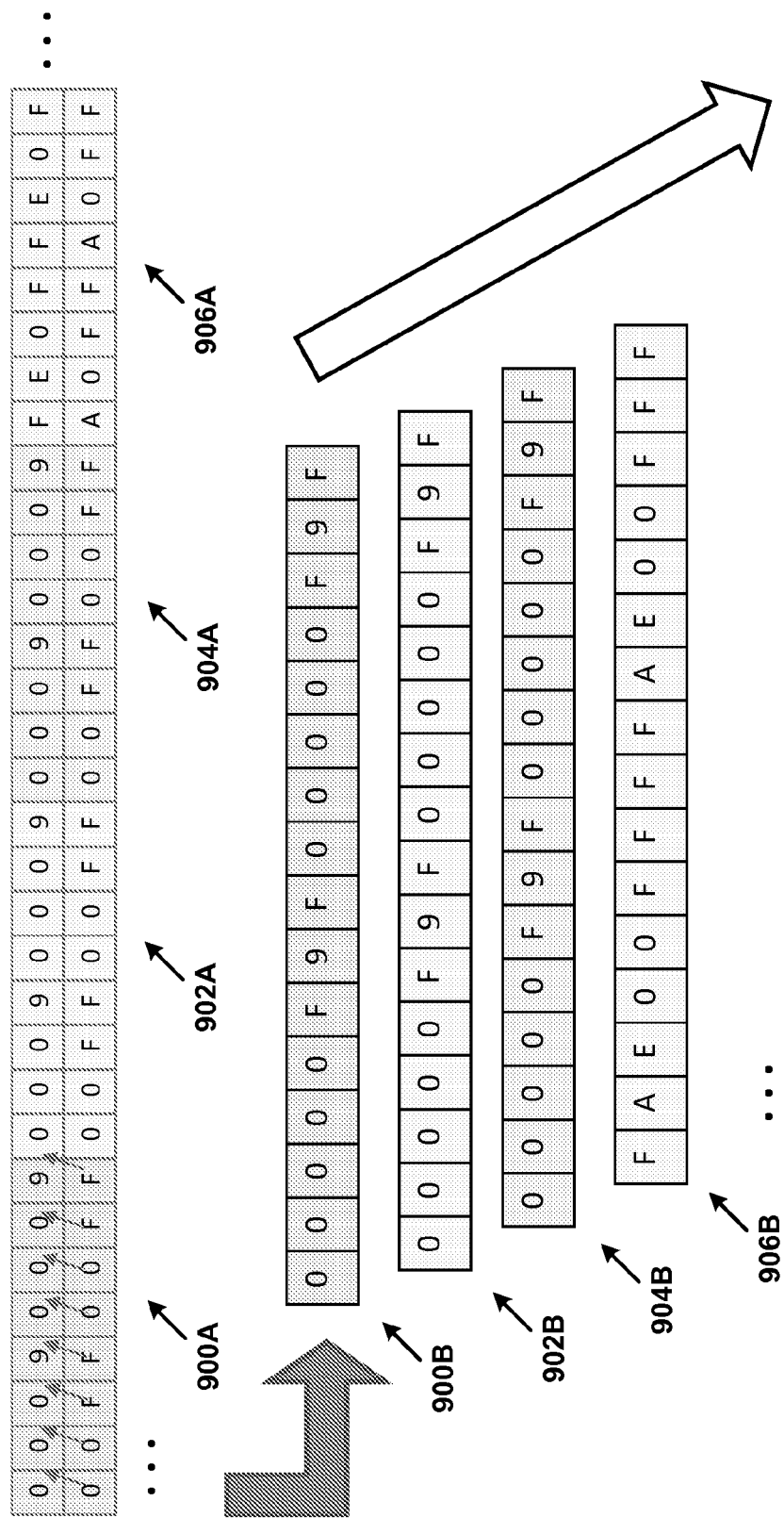
FIG. 9 depicts interleaving a halftoned version of an image, according to an example embodiment.

Given the halftoned pixels of an image block, these pixels can be arranged into segments. One possible way of making such an arrangement is illustrated in FIG. 9. In FIG. 9 it is assumed that the halftone matrix applied to the image block is 8 cells wide and 2 cells high. Nonetheless, other sizes of halftone matrices may be used. For example, some embodiments may use m×n pixel halftone matrices that are m cells wide and n cells high. These segments may include pixels in padding columns.

Particularly, FIG. 9 shows a portion of the top two rows of halftoned pixels 800 arranged into segments 900A, 902A, 904A, and 906A. Each segment is the size of the halftone matrix—that is, 8 pixels wide and 2 pixels high, or 8×2. However, in full generality, if an m×n cell halftone matrix is used, m×n pixel segments may be used accordingly.

FIG. 9 also shows a 2-way interleaving of each segment. For instance, in segment 900A the top pixels of that segment are interleaved, one-by-one with the bottom pixels of that segment. The result may be interleaved segment 900B, which is 16 pixels wide and 1 pixel high. In a similar fashion, segment 902A may be interleaved to form interleaved segment 902B, segment 904A may be interleaved to form interleaved segment 904B, and segment 906A may be interleaved to form interleaved segment 906B. In general, if the height of a segment is n pixels, then an n-way interleaving may be used. Thus, for sake of clarity, these interleaved segments may be optionally referred to as mn×1 halftone segments.

Once they are formed, interleaved segments 900B, 902B, 904B, and 906B may be arranged in the order shown in FIG. 9, in which the interleaved leftmost segment is followed by the interleaved second-leftmost segment, and so on. These interleaved segments may be provided, in that particular order, to one or more buffers arranged to store these segments for further processing. Thus, references to a "segment" in the following discussion may presume that the segment is an interleaved segment. Further, the sequence of these segments may be referred to as the "input stream" of the buffers.

Figure 10:
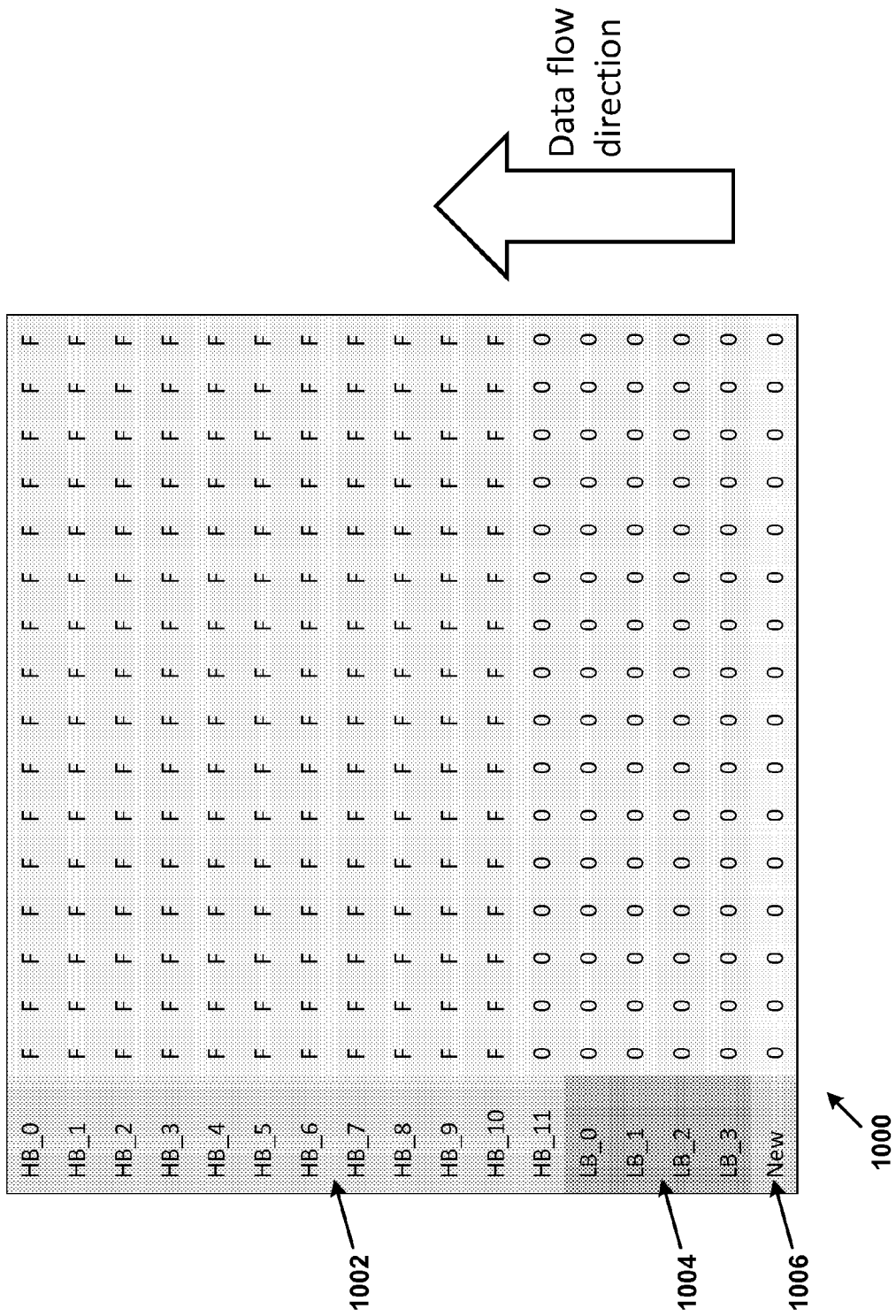
FIG. 10 depicts a history buffer, a lookahead buffer, and new segment buffer, according to an example embodiment.

FIG. 10 depicts buffer arrangement 1000, containing a 12-segment history buffer 1002 (entries HB_0 through HB_11) a 4-segment lookahead buffer 1004 (entries LB_0 through LB_3) and a "new" buffer 1006. History buffer 1002 may be a FIFO buffer, in that segments inserted at one end of history buffer 1002 (e.g., HB_11) may be propagated through to the other end of history buffer 1002 (e.g., HB_0) in their order of insertion. The general direction of data flow is shown in FIG. 10 as from bottom to top; that is, a segment may first be placed in the "new" buffer 1006, moved to lookahead buffer 1004, and then to history buffer 1002.

For sake of convenience, history buffer 1002 may be referred to as "the FIFO buffer" and may consist of h entries, while lookahead buffer 1004 may consist of k entries. "New" buffer 1006 may consist of a single entry as shown in FIG. 10, or more entries. Therefore, it should be appreciated that the individual buffers of buffer arrangement 1000 may each contain any number of entries, and that the specific arrangement shown in FIG. 10 is for purpose of example. For instance, in some implementations, the entry of "new" buffer 1006 may be considered to be part of lookahead buffer 1004.

In general, halftone segments may be compressed by finding matching segments in history buffer 1002. Particularly, the current sequence of segments in lookahead buffer 1004 may be compared with the segment sequences in history buffer 1002 to determine the longest match between the respective sequences of segments that can be made. The segments included in lookahead buffer 1004 may be considered to be part of history buffer 1002 when considering matches starting with HB_9, HB_10, or HB_11.

Figure 11:
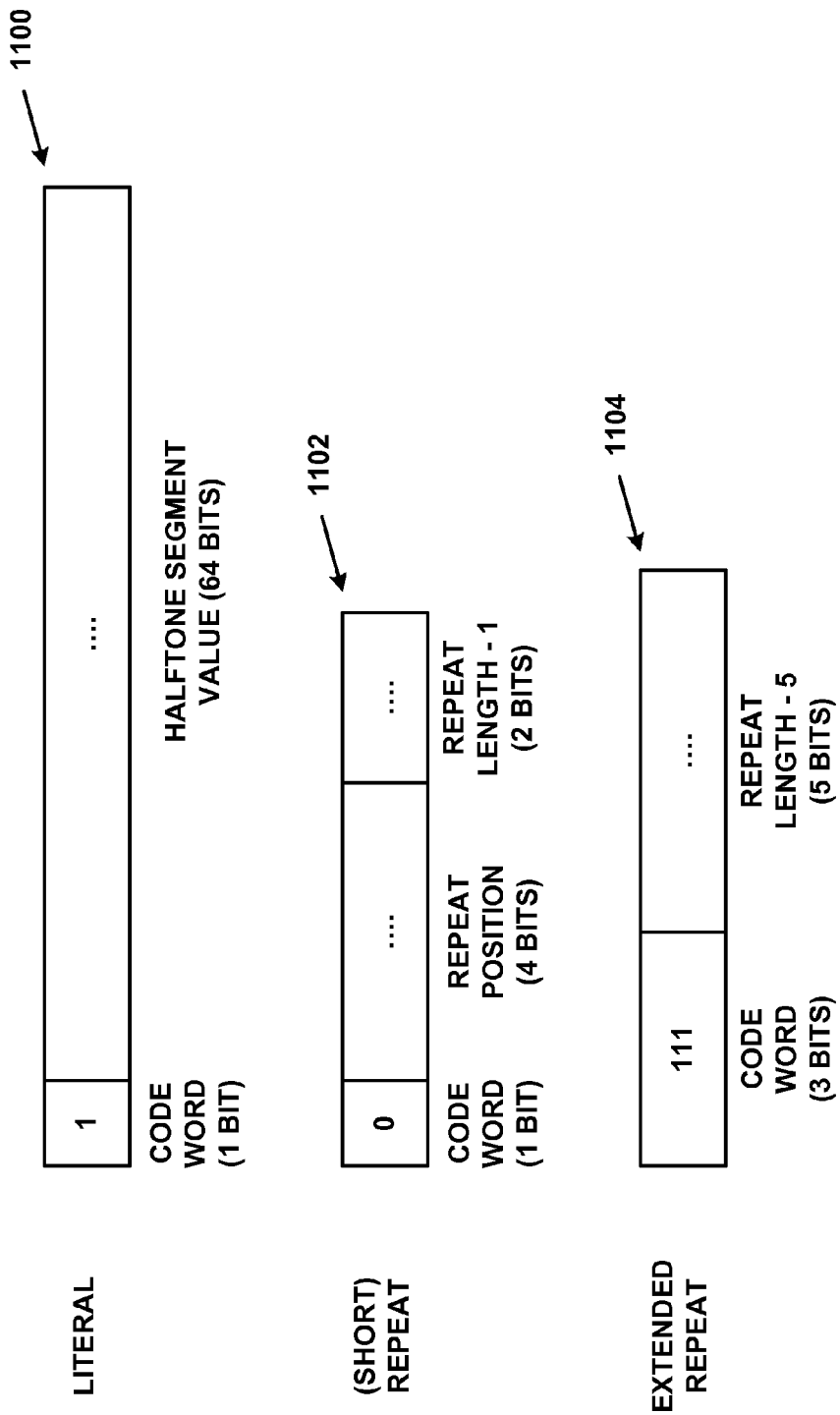
FIG. 11 depicts formats of halftoned segments after compression, according to an example embodiment.

FIG. 11 depicts several different formats that may be used to represent halftone segments after compression. FIG. 11 is based on buffer arrangement 1000 of FIG. 10; that is, 64-bit segments, 12 entries in the history buffer, 4 entries in the lookahead buffer, and one entry in the "new" buffer. Nonetheless, other buffer arrangements may be supported, possibly by adjusting the formats of FIG. 11 accordingly. For purposes of illustration, the sizes of formats 1100, 1102, and 1104 are not shown to scale.

Format 1100 may represent a literal encoding of a segment, and may be used when a particular segment cannot be compressed based on information in buffer arrangement 1000. Therefore, format 1100 may begin with a literal code word, which may be a single bit set to 1. The literal code word may indicate that the next field includes an uncompressed segment. Particularly, this next field may be 64 bits and may be a copy of a segment that could not be compressed.

Format 1102 may be referred to as a repeat or short repeat format. Format 1102 may begin with a repeat code word, which may be a single bit set to 0. This field may be followed by a 4-bit repeat position field, and a 2-bit repeat length field. The repeat position field may indicate where in the history buffer the repeated segments begin. The repeat length field may indicate the number of repeated segments starting from that position. To make efficient use of the bits in the repeat length field, this field may contain the number of repeated segments minus 1. Thus, if the repeat length field contains a value of "00", a repeat length of 1 may be represented. If the repeat length field contains a value of "01", a repeat length of 2 may be represented, and so on.

Format 1104 may be referred to as an extended repeat or long repeat format. Format 1104 may begin with an extended repeat code word, which may be three bits set to 1. This field may be followed by a 5-bit repeat length field, indicating the number of times the segment in entry HB_11 is repeated in lookahead buffer 1004, "new" buffer 1006, and/or the input stream. To make efficient use of the bits in the repeat length field, this field may contain the number of repeated segments minus 5. Thus, if the repeat length field contains a value of "00000", a repeat length of 5 may be represented. If the repeat length field contains a value of "00001", a repeat length of 6 may be represented, and so on.

Figure 12:
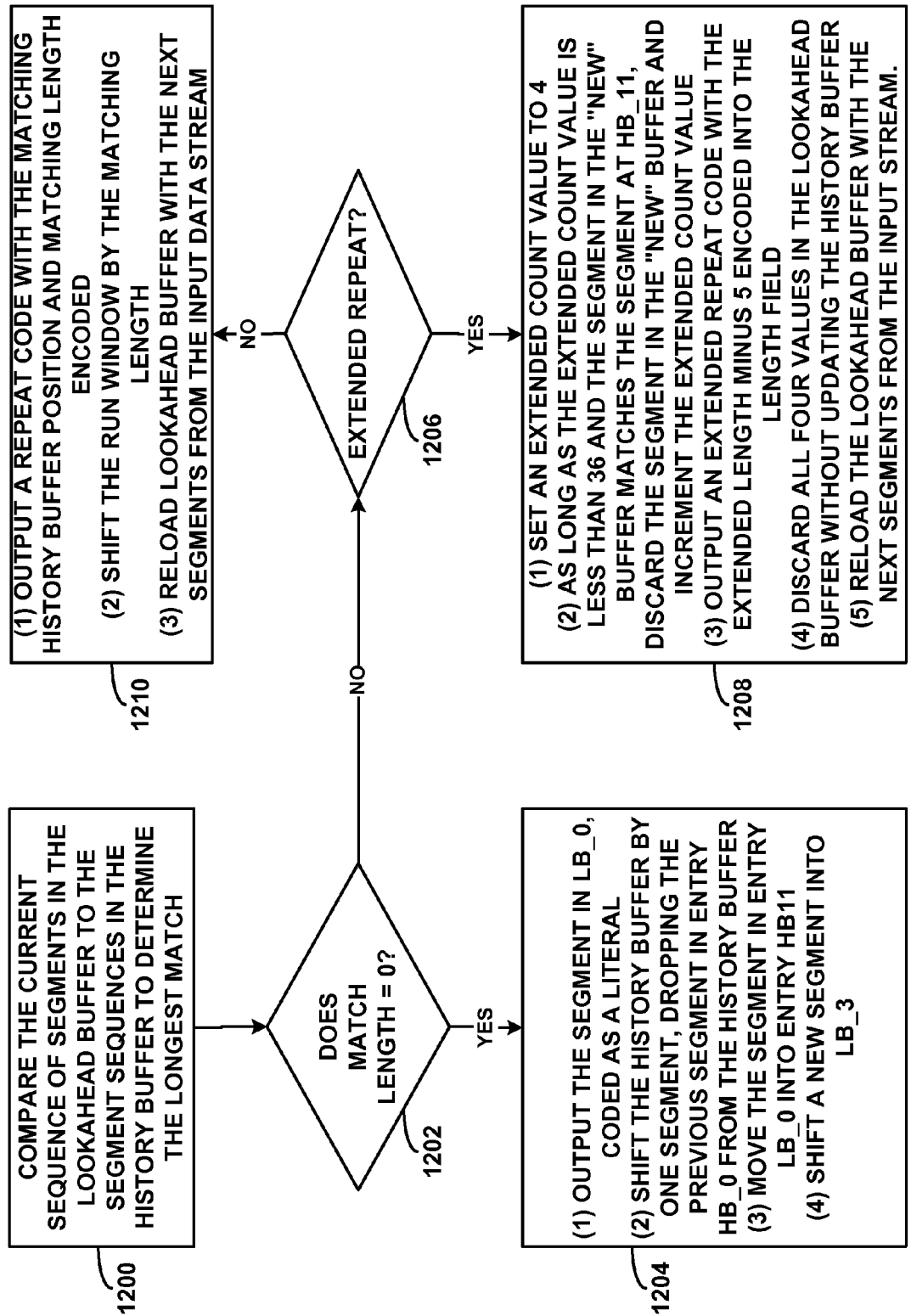
FIG. 12 is a flow chart, according to an example embodiment.

FIG. 12 is a flow chart of the overall process that may be followed to determine which of the formats of FIG. 11 to use in a particular scenario. As noted above, at step 1200, the current sequence of segments in lookahead buffer 1004 may be compared with the segment sequences in history buffer 1002 to determine the longest match between the respective sequences of segments that can be made. "New" buffer 1006 may contain the next segment that will be read from the input stream.

At step 1202, it is determined whether the match length is zero, indicating that no match has been found. If the match length is zero, then, at step 1204, the following actions may be taken: (1) output the segment in LB_0, encoded in format 1100, (2) shift the history buffer by one segment, dropping the previous segment in entry HB_0 from the history buffer, (3) move the segment in entry LB_0 into entry HB11, and (4) shift a new segment into LB_3.

If the match length is a non-zero, the actions taken may depend on the length of the match. At step 1206, it is determined whether to following condition is true: the match starts at HB_11 and has a length of five (all lookahead buffer segments are the same and equal to the segment HB_11, and the segment in "new" buffer 1006 also matches the value in HB_11).

If the condition is true, then, at step 1208, the following actions may be taken: (1) set an extended count value to 5, (2) as long as the extended count value is less than 36 and the segment in "new" buffer 1006 matches the segment at HB_11, discard the segment in "new" buffer 1006 and increment the extended count value, (3) using format 1104, output an extended repeat code with the final extended length encoded in the repeat length field, (4) discard all four values in lookahead buffer 1004 without updating history buffer 1002, and (5) reload lookahead buffer 1004 with the next segments from the input stream.

If the condition is not true, then, at step 1210, the following actions may be taken: (1) output format 1102 with the matching history buffer 1002 position and matching length encoded, (2) shift the run window by the matching length, and (3) reload lookahead buffer 1006 with the next segments from the input data stream. If multiple matches with the same non-zero best match length exist, then the match beginning with the lowest history buffer 1002 index number may be used.

Note that the decompressor module may start with the same initial history buffer values and may maintain the run window using the same rules as the compressor module. Additionally, if the image to be compressed is not an integral multiple of the segment size, the last segment may be filled out with 0 bits when the input stream is exhausted.

In order to further illustrate some of the various ways that halftoned images or image blocks can be compressed, FIGS. 13-18 provide examples of how the buffers of FIG. 10, formats of FIG. 11, and process of FIG. 12 can be operated to facilitate such compression.

Figure 13:
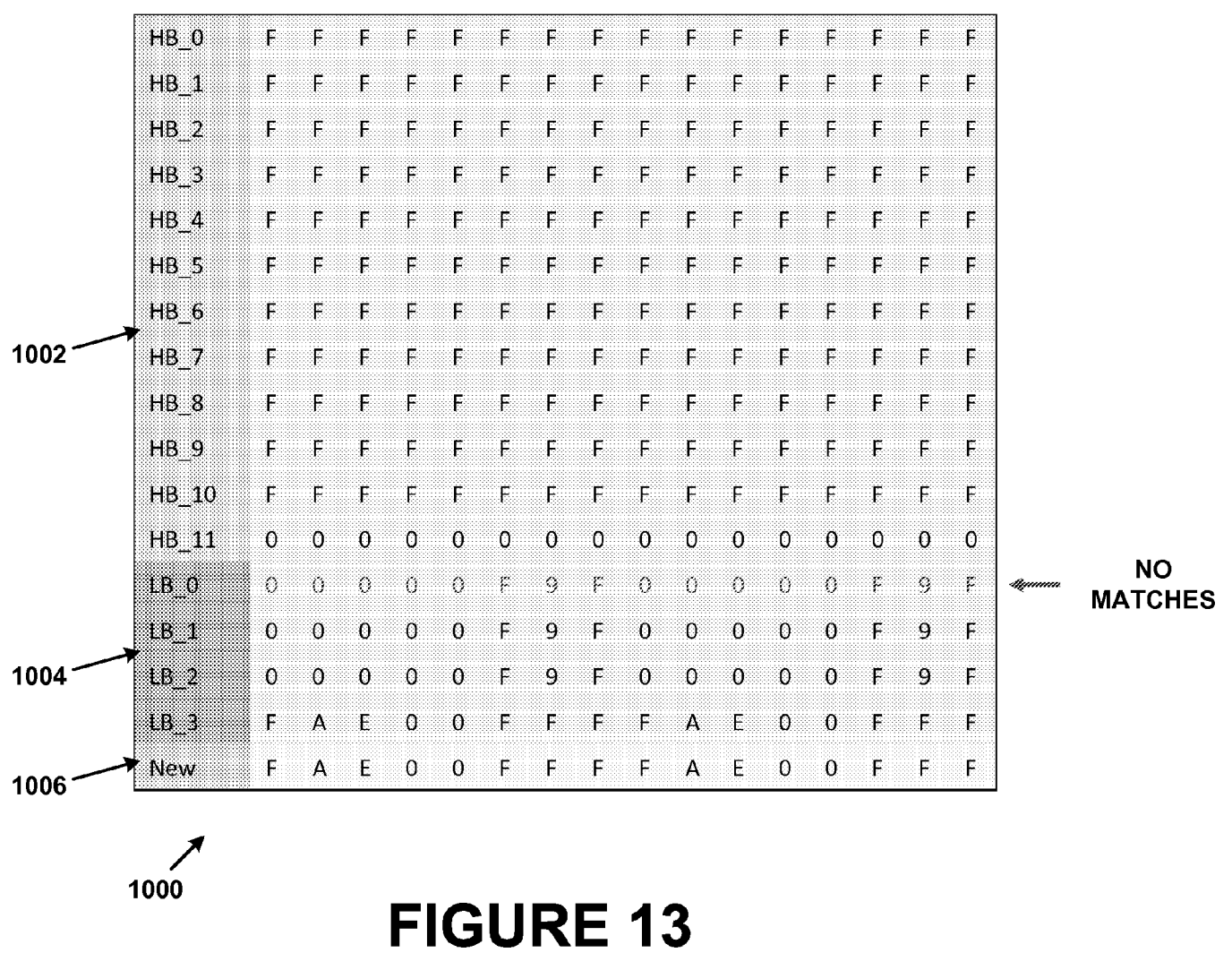

FIG. 13 shows how segments from the input stream may be added to "new" buffer 1006 and lookahead buffer 1004. Upon initialization, history buffer 1002 may be loaded with all "F" values (i.e., 1111 in binary) for the entries HB_0 through HB_10 and all "0" values (i.e., 0000 in binary) for the entry HB_11. Lookahead buffer 1004 may be loaded with the first four segments from the input stream.

In the scenario shown in FIG. 13, no match can be found. Accordingly, the output in format 1100 may be generated, including a literal code word indicating that the output segment is uncompressed, and a copy of the output segment (e.g., the 64 bits represented by the segment at LB_0, "00000F9F00000F9"). Thus, a total of 65 bits may be output for this segment.

Additionally, the segments of history buffer 1002 may be shifted up by one entry, which includes discarding the segment in entry HB_0. The output segment may also be written entry HB_11.

Figure 14:
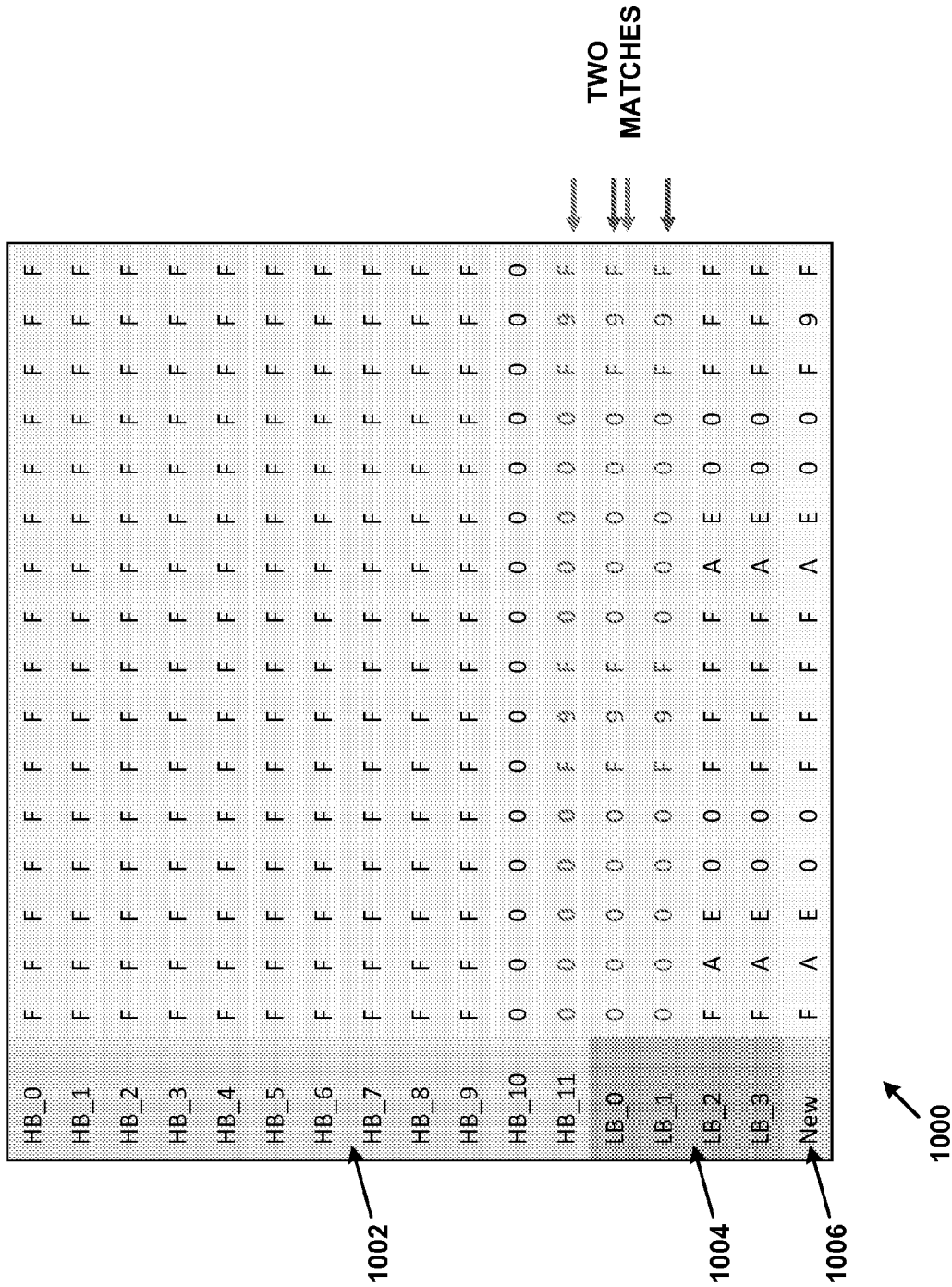
FIG. 14 depicts operation of a history buffer, a lookahead buffer, and new segment buffer in which a match is found for two segments of the lookahead buffer, according to an example embodiment.

FIG. 14 illustrates an example scenario in which a two-segment match is found between segments in lookahead buffer 1004 and history buffer 1002. The example scenario of FIG. 14 continues approximately from where the example scenario of FIG. 13 left off. Thus, the segments of lookahead buffer 1004 have been shifted up by one entry, the segment in "new" buffer 1006 has been shifted into LB_3, and the next segment from the input stream has been placed in "new" buffer 1006.

The sequence of segments in lookahead buffer 1004 again may be compared with the segment sequences in history buffer 1002 to determine the longest match between the respective sequences of segments in those buffers. This time, the segments of LB_0 and LB_1 match the segments HB_11 and LB_0 for a match of 2 segments (as noted above, when searching for matches, the contents of lookahead buffer 1004 may be considered to be part of history buffer 1002).

In response to determining that there is a match of two segments, output in format 1102 may be generated. This output may include a repeat code word of 0 (binary), a repeat position of 1011 (binary), indicating that the match begins at HB_11, the 11th buffer entry, and a repeat length of 01 (binary) indicating that the segment at HB_11 is repeated twice (as noted above, for purposes of efficiency, the repeat length codes may denote the repeat length minus 1). Thus, in place of two 64-bit segments, one 7-bit value may be used.

Additionally, the segments in history buffer 1002 may be shifted up by two entries, which may include discarding the segments in entries HB_0 and HB_1. Further, the segments in lookahead buffer may be shifted up by two entries, which may involve the segments in entries LB_0 and LB_1 being shifted to entries HB_10 and HB_11. Additionally, the segment in "new" buffer 1006 may be shifted into entry LB_2, and the next two segments from the input stream may be stored in entry LB_3 and "new" buffer 1006, respectively.

Figure 15:
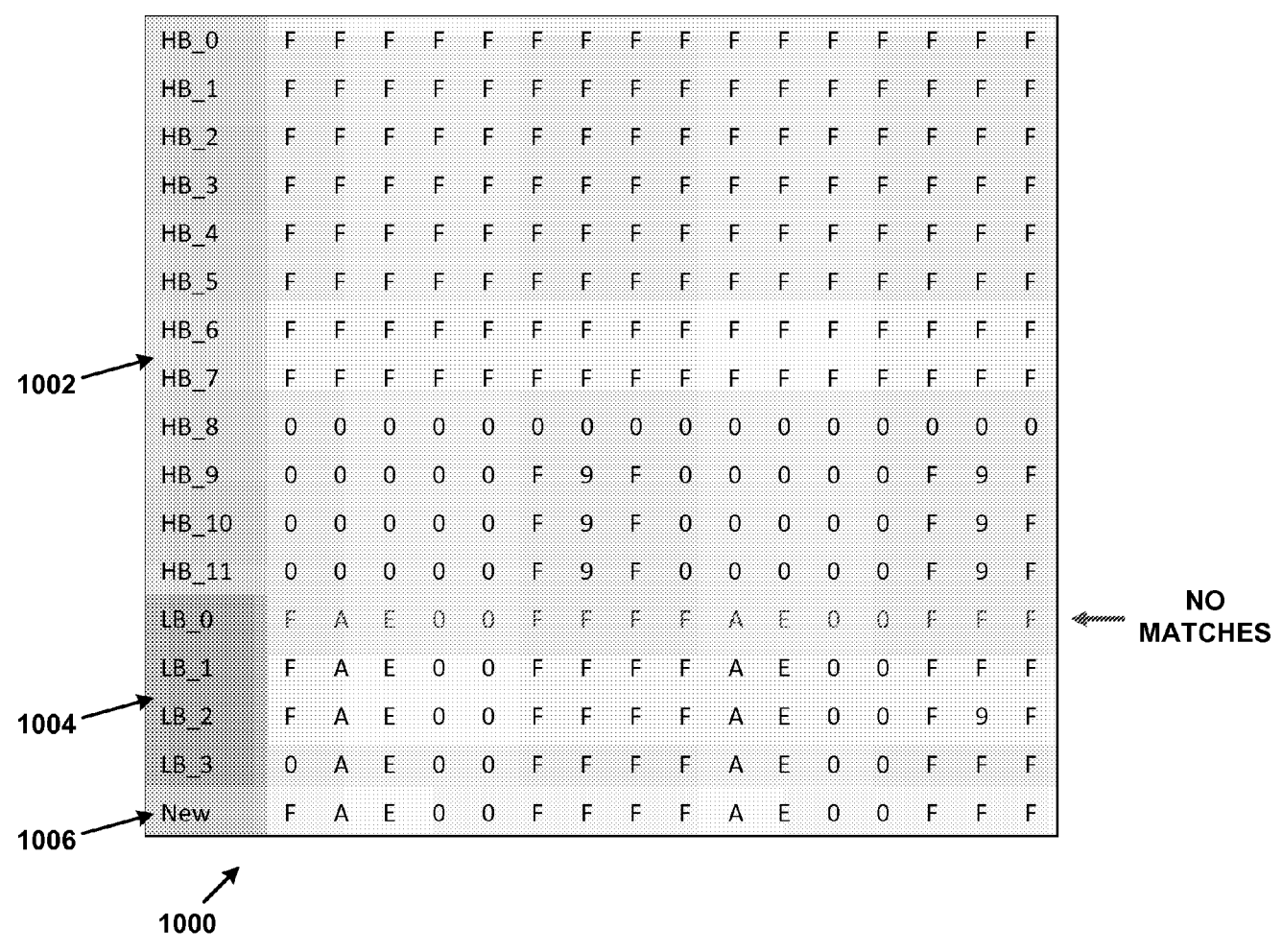

FIG. 15 depicts another scenario that continues approximately from where the example scenario of FIG. 14 left off. Once more, the sequence of segments in lookahead buffer 1004 may be compared with the segment sequences in history buffer 1002 to determine the longest match between the respective sequences of segments in those buffers. In this scenario, like that of the scenario of FIG. 13, no match (a zero-length match) is found.

Accordingly, output in format 1100 may be generated. This output may include a literal code word indicating that the output segment is uncompressed (1 binary), and a copy of the output segment (e.g., the 64 bits represented by the segment at LB_0, "FAE00FFFFAE00FFF"). Thus, a total of 65 bits may be output for this segment. Additionally, the segments of history buffer 1002 may be shifted up by one entry, which includes discarding the segment in entry HB_0. The output segment may also be written entry HB_11.

Figure 16:
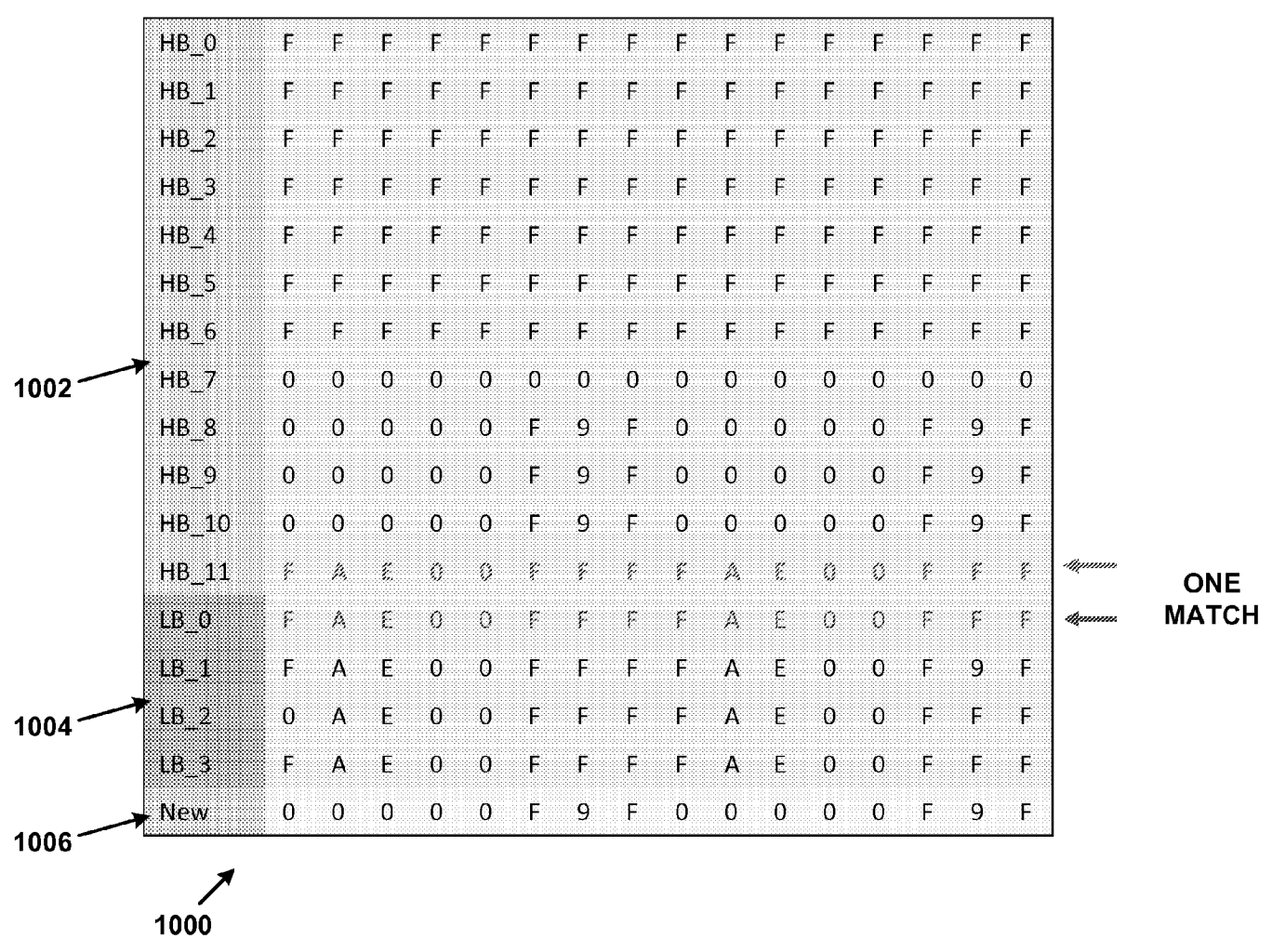

FIG. 16 illustrates an example scenario in which a one-segment match is found between segments in lookahead buffer 1004 and history buffer 1002. The example scenario of FIG. 16 continues approximately from where the example scenario of FIG. 15 left off The sequence of segments in lookahead buffer 1004 again may be compared with the segment sequences in history buffer 1002 to determine the longest match between the respective sequences of segments in those buffers. This time, the longest match is between the segment in entry LB_0 and the segment in entry HB_11.

In response to determining that there is a match of one segment, output in format 1102 may be generated. This output may include a repeat code word (0 binary), a repeat position of 1011 (binary), indicating that the match begins at HB_11, the 11th buffer entry, and a repeat length of 00 (binary) indicating that the match is one segment long (again, the repeat length may denote the actual repeat length minus 1). Thus, in place of a 64-bit segment, one 7-bit value may be used.

Additionally, the segments in history buffer 1002 may be shifted up by one entry, which may include discarding the segment in entry HB_0. Further, the segments in lookahead buffer may also be shifted up by one entry, which may involve the segment in entry LB_0 being shifted to entry HB_11. The segment in "new" buffer 1006 may be shifted into entry LB_3 of lookahead buffer 1004, and the next segments from the input stream may be stored in "new" buffer 1006, respectively.

Figure 17:
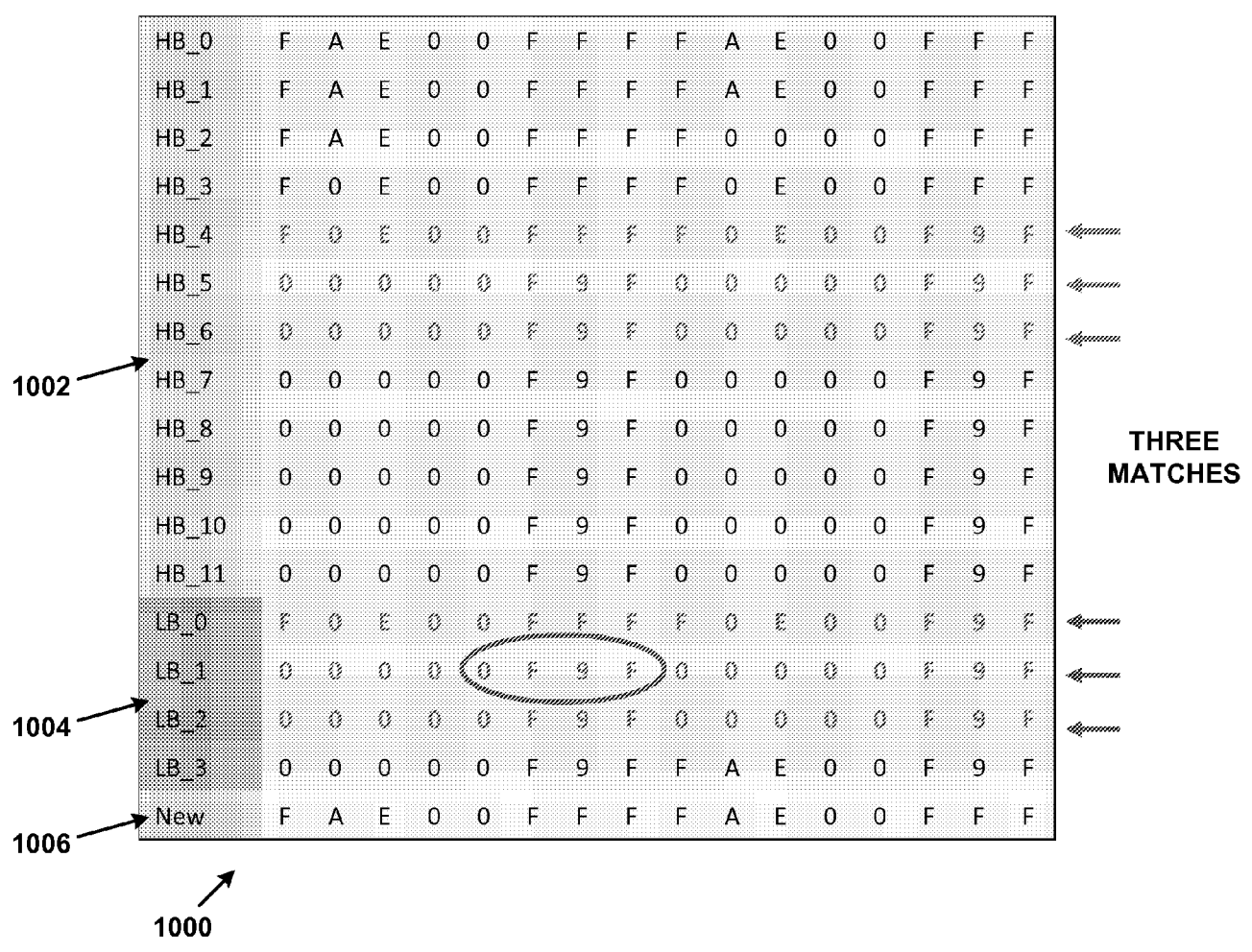

FIG. 17 illustrates an example scenario in which a three-segment match is found between segments in lookahead buffer 1004 and history buffer 1002. The sequence of segments in lookahead buffer 1004 again may be compared with the segment sequences in history buffer 1002 to determine the longest match between the respective sequences of segments in those buffers. This time, the longest match is between the segments in entries LB_0, LB_1, and LB_2 and the segments in entries HB_4, HB_5, and HB_6. The values circled in FIG. 17 represent values from padding columns.

In response to determining that there is a match of three segments, output in format 1102 may be generated. This output may include a repeat code word (0 binary), a repeat position of 0100 (binary), indicating that the match begins at HB_4, the fourth entry of history buffer 1002, and a repeat length of 10 (binary) indicating that the match continues for three segments. Thus, in place of three 64-bit segments, one 7-bit value may be used.

Additionally, the segments in history buffer 1002 may be shifted up by three entries, which may include discarding the segments in entries HB_0, HB_1, and HB_2. Further, the segments in lookahead buffer may also be shifted up by three entries, which may involve the segments in entries LB_0, LB_1, and LB_2 being shifted to entries HB_9, HB_10, and HB_11. The segment in "new" buffer 1006 may be shifted into entry LB_1, and the next three segments from the input stream may be stored in LB_2, LB_3, and "new" buffer 1006, respectively.

Figure 18:
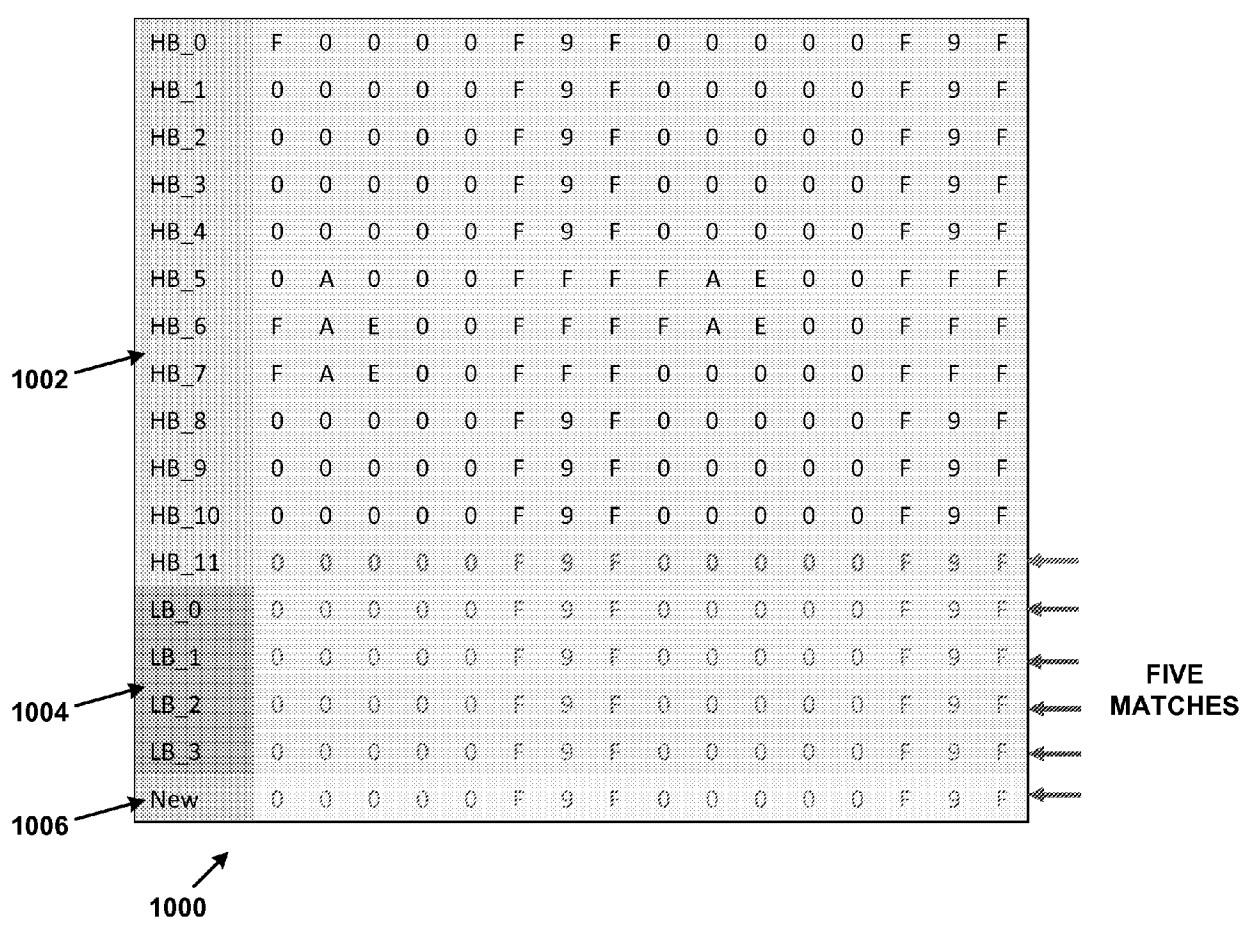

FIG. 18 illustrates an example scenario in which a five-segment match is found between segments in lookahead buffer 1004 and history buffer 1002. This scenario is an example of an "extended repeat" in which the segment in entry HB_11 matches all of the entries in lookahead buffer 1004 and "new" buffer 1006. Thus, the longest match is between the segments in entries HB11, LB_0, LB_1, LB_2, and LB_3, and the segments in entries LB_0, LB_1, LB_2, LB_3, and "new" buffer 1006.

In response to determining that there is an extended repeat match of five segments, output using format 1104 may be generated. This output may include an extended repeat code word of 111 (binary), and a repeat length of 00000 (binary) indicating that the match continues for five segments (for extended repeat code words, the repeat length codes may denote the repeat length minus 5). Thus, in place of five 64-bit segments, one 8-bit value may be used. In scenarios in which the repeat continues for additional segments, the input stream may continue to be read and the repeat length may be incremented accordingly.

Figure 19A:
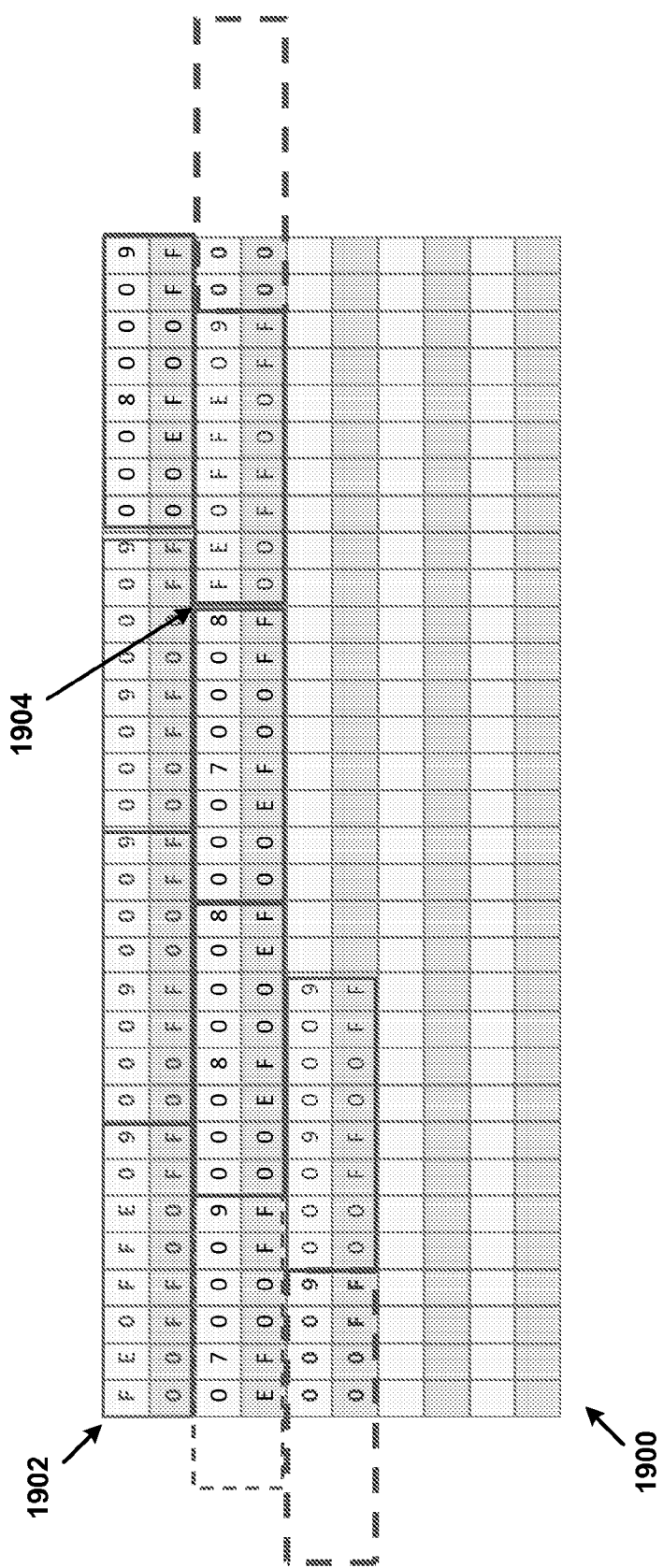

FIGS. 19A, 19B, 19C, and 19D provide further illustration of the possible benefits of the column padding mechanisms described above. FIG. 19A depicts example image block 1900 with overlaid example 8×2 halftone matrices. Notably, after halftoning, the pixels aligned with the three halftone matrices that begin at point 1902 are identical to the pixels aligned with the three halftone matrices that begin at point 1904.

Figure 19B:
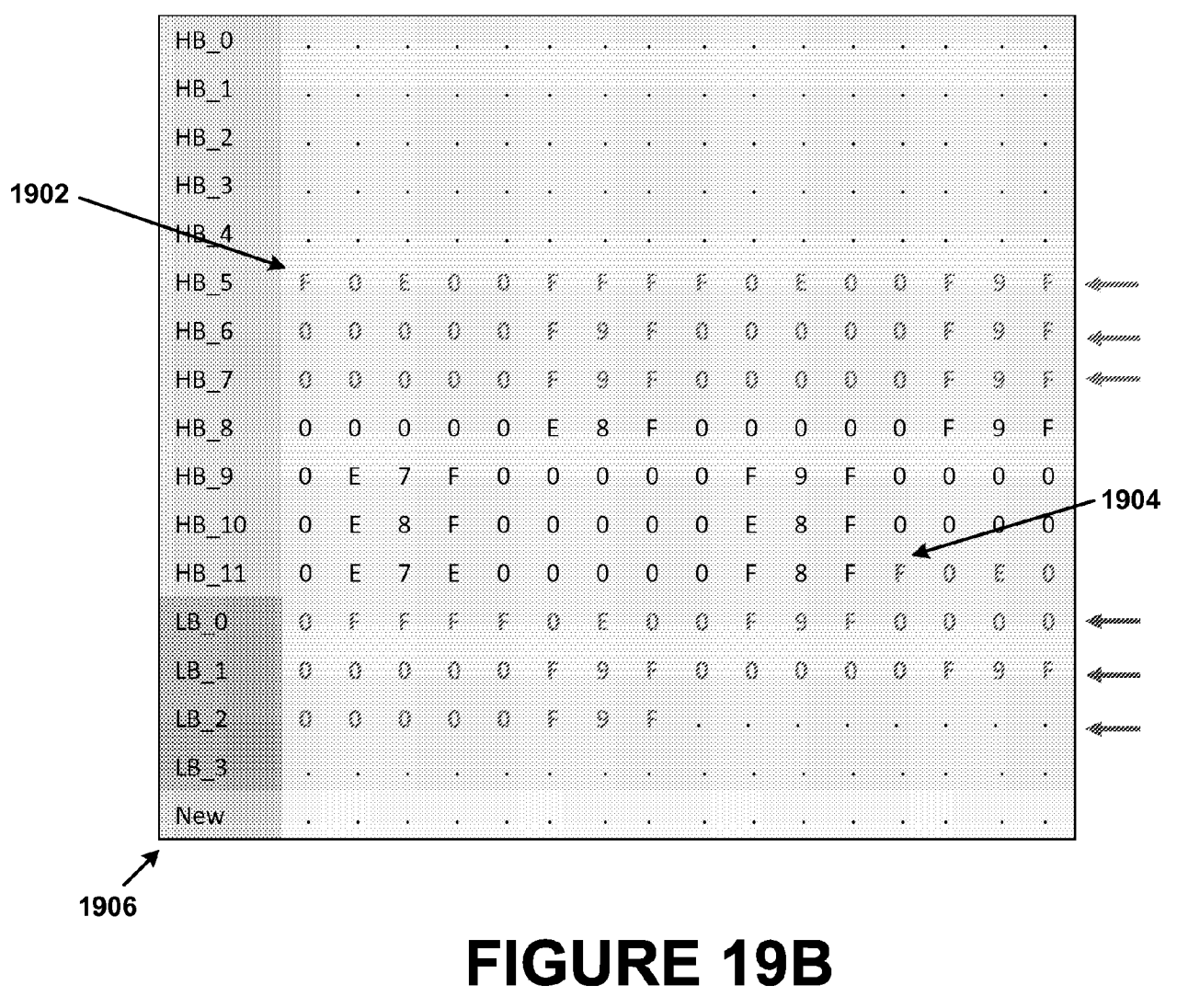

FIG. 19B depicts buffer arrangement 1906, containing the halftone matrices of FIG. 19A after interleaving. As can be seen in FIG. 19B, even though the pixels aligned with the three halftone matrices that begin at point 1902 are identical to the pixels aligned with the three halftone matrices that begin at point 1904, they are offset from one another in buffer arrangement 1906. Consequently, there is no match between entries in the lookahead buffer and the history buffer.

Figure 19C:
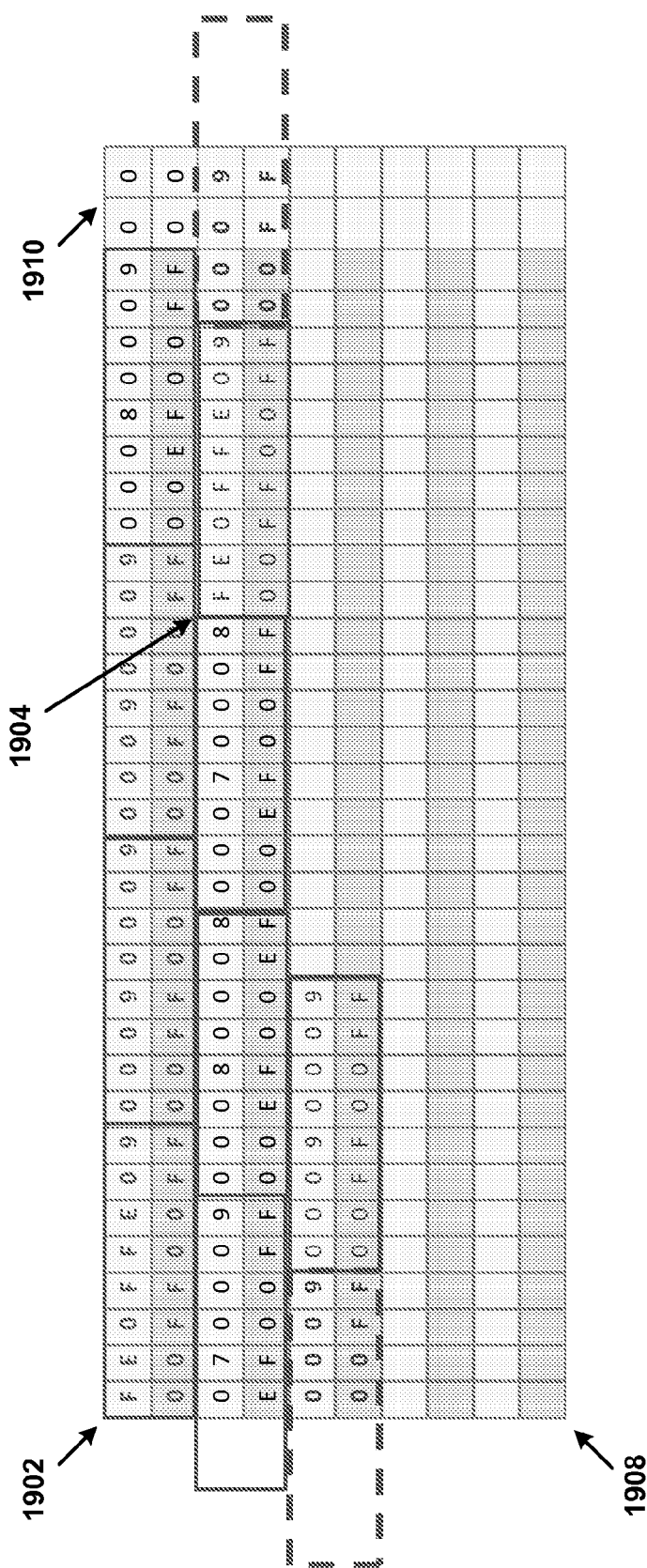

FIG. 19C depicts example image block 1908 with overlaid example 8×2 halftone matrices. Example image block 1908 is similar to that of example image block 1900, except that two padding columns 1910 are applied to the right-hand side. The pixels aligned with the three halftone matrices that begin at point 1902 are identical to the pixels aligned with the three halftone matrices that begin at point 1904 except for the changes made by the incorporation of padding columns 1910.

Figure 19D:
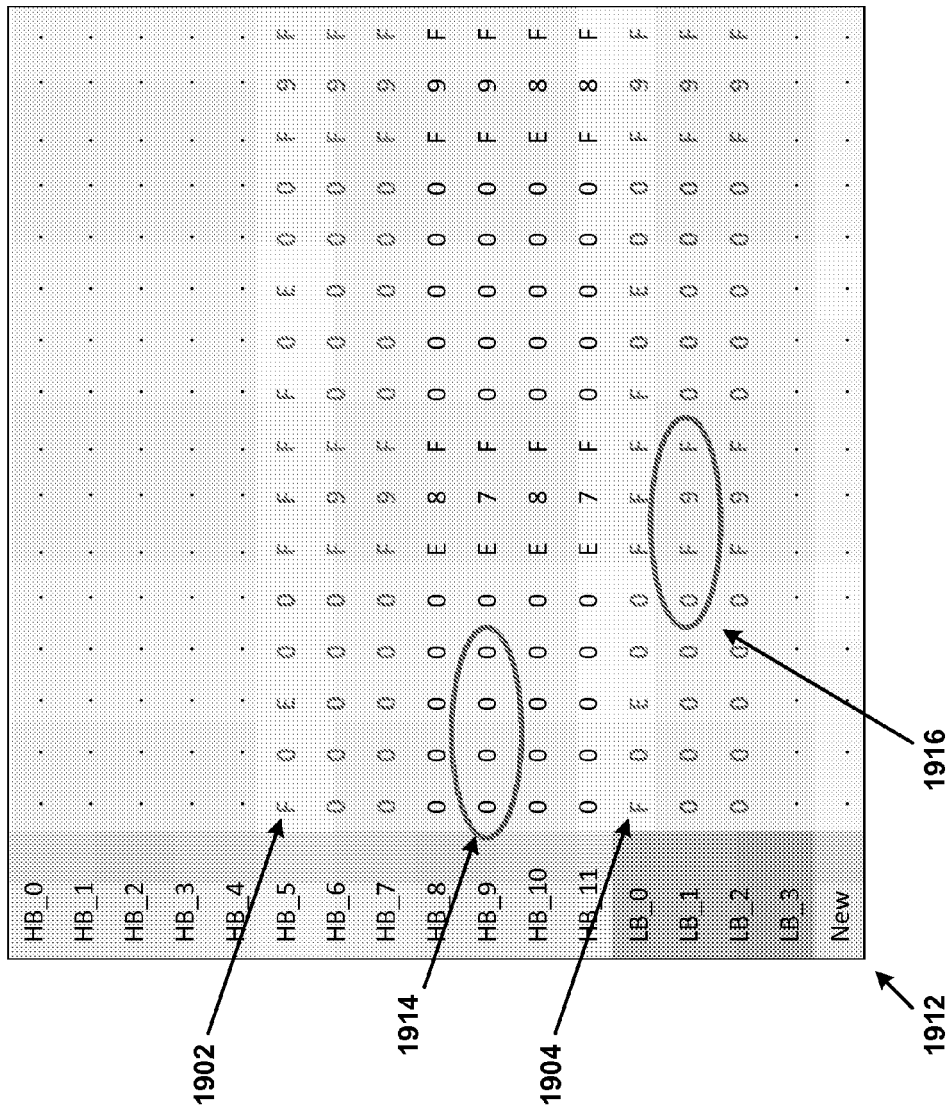

FIG. 19D depicts buffer arrangement 1912, containing the halftone matrices of FIG. 19C after interleaving. The first two pixels 1914 of the padding columns (the top-most padding pixels) are circled, as are the second two pixels 1916 of the padding columns (the second top-most padding pixels). As can be seen in FIG. 19D, the incorporation of the padding columns result in three matches between the history buffer and the lookahead buffer.

Particularly, entries HB_5, HB_6, and HB_7 match entries LB_0, LB_1, and LB_2. In this way, padding columns may result in more efficient compression of halftoned images.

4. EXAMPLE OPERATION

Figure 20:
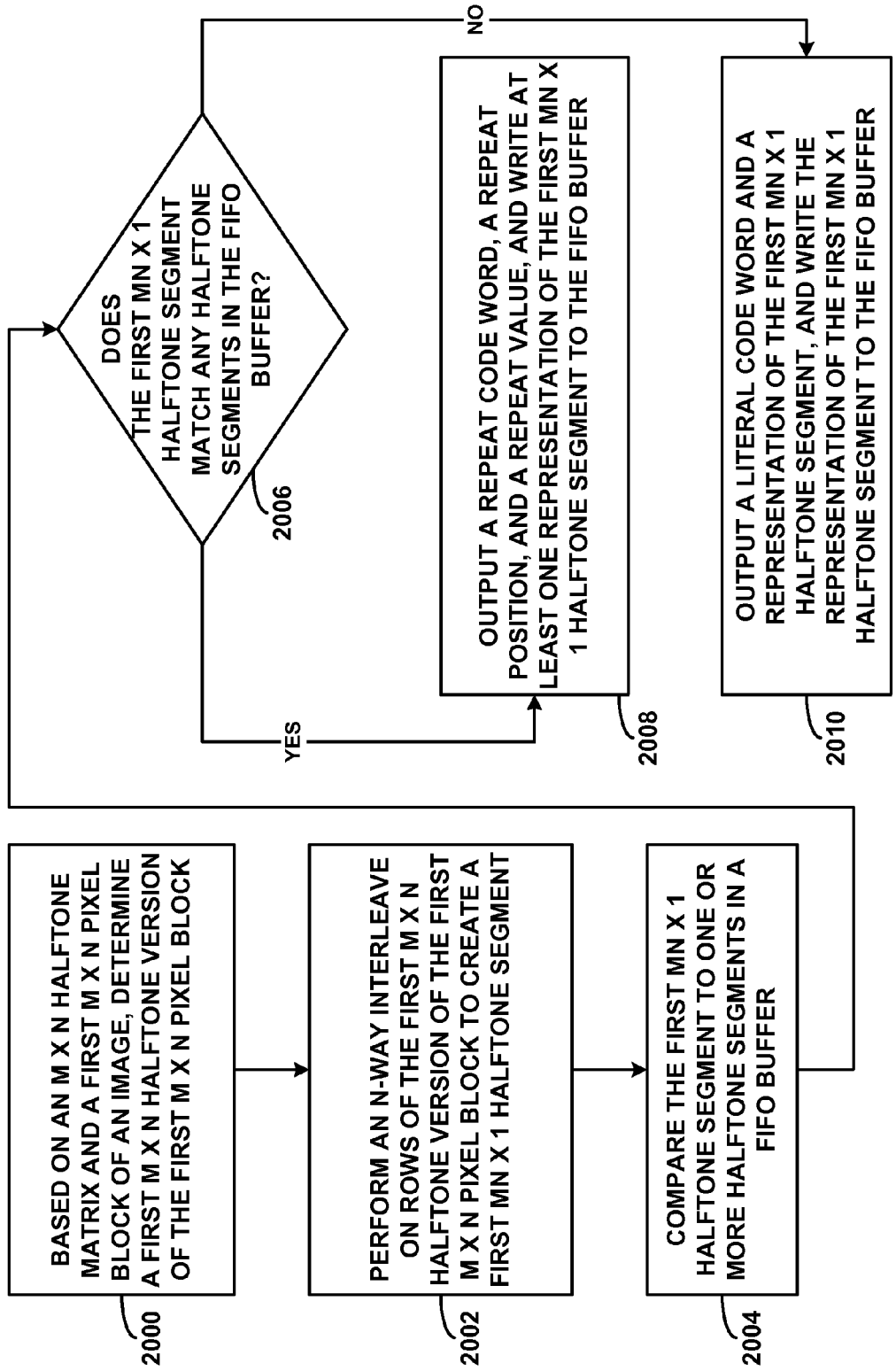
FIG. 20 is a flow chart, according to an example embodiment.

FIG. 20 is a flow chart of an example embodiment. The steps illustrated by this flow chart may be carried out by one or more printing devices, such as printing device 100, and/or computing devices, such as computing device 300. Aspects of each individual step may be performed by a single device or distributed between multiple computing devices. The example embodiment of FIG. 20 may also include any feature or features disclosed throughout this specification and/or the accompanying drawings.

At step 2000, based on an m×n halftone matrix and a first m×n pixel block of an image, a first m×n halftone version of the first m×n pixel block may be determined. This determination may involve tiling the m×n halftone matrix over the image such that starting positions of vertically contiguous tiles of the m×n halftone matrix are offset by q pixels. Additionally, r 1×n padding pixel columns may be appended to the rightmost column of the image. In some embodiments, p may be the width of the image in pixels before appending the r 1×n padding pixel columns, and r may be m−(p−q) mod m.

At step 2002, an n-way interleave may be performed on rows of the first m×n halftone version of the first m×n pixel block to create a first mn×1 halftone segment.

At step 2004, the first mn×1 halftone segment may be compared to one or more halftone segments in a first-in-first-out (FIFO) buffer. This comparison may involve determining the longest consecutive extent of halftone segments in the FIFO buffer that match the first mn×1 halftone segment and any other halftone segments contiguously following the first mn×1 halftone segment.

At step 2006, it may be determined whether the first mn×1 halftone segment matches any halftone segments in the FIFO buffer. If the first mn×1 halftone segment matches a particular halftone segment in the FIFO buffer, then at step 2008 a repeat code word and a repeat value may be output, and at least one representation of the first mn×1 halftone segment may be written to the FIFO buffer. In some embodiments, a repeat position indicative of a location of the particular halftone segment in the FIFO buffer may be included in this output.

If the first mn×1 halftone segment does not match any halftone segments in the FIFO buffer, then at step 2010 a literal code word and a representation of the first mn×1 halftone segment may be output, and the representation of the first mn×1 halftone segment may be written to the FIFO buffer.

In some embodiments, the first mn×1 halftone segment may be stored in one or more lookahead buffers with k−1 other mn×1 halftone segments. Additionally, j−1≤k of the other mn×1 halftone segments in the FIFO buffer may also match the particular halftone segment. The j matching halftone segments may be contiguous in the lookahead buffer(s), and/or the repeat value is indicative of j. Writing the at least one representation of the first mn×1 halftone segment to the FIFO buffer may involve writing j representations of the first mn×1 halftone segment to the FIFO buffer. Further, the k−1 other mn×1 halftone segments may be derived from other m×n pixel blocks of the image. In some implementations, the j matching halftone segments may be removed from the lookahead buffer(s).

In addition, the repeat code word may be either a short repeat code word or an extended repeat code word. In either case, j may be compared to k. If j<k, the short repeat code word may be used as the repeat code word, and if j≥k, the extended repeat code word may be used as the repeat code word. If the extended repeat code word is the repeat code word, then after writing j representations of the first mn×1 halftone segment to the FIFO buffer, at least one entry in the lookahead buffer may be replaced with a second mn×1 halftone segment. The second mn×1 halftone segment may be derived from a second m×n pixel block of the image.

Moreover, each cell of the m×n halftone matrix may contain i−1 threshold values. The i−1 threshold values may define i pixel value ranges, and each cell of the first m×n halftone version of the first m×n pixel block may contain a $\log_2$ (i)-bit value. Determining the first m×n halftone version of the first m×n pixel block may involve, for each particular cell in the first m×n pixel block, (i) determining a particular pixel value of the particular cell in the first m×n pixel block, (ii) determining that one of the i pixel value ranges in a particular cell of the m×n halftone matrix encompasses the particular pixel value, where the particular cell in the first m×n pixel block corresponds to the particular cell of the m×n halftone matrix, and (iii) writing, to a particular cell of the first m×n halftone version of the first m×n pixel block, a $\log_2$ (i)-bit value that represents the determining one of the i pixel value ranges.

5. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   based on an m×n halftone matrix and a first m×n pixel block of an image, determining, by a computing device, a first m×n halftone version of the first m×n pixel block;
   performing an n-way interleave on rows of the first m×n halftone version of the first m×n pixel block to create a first mn×1 halftone segment;
   comparing the first mn×1 halftone segment to one or more halftone segments in a first-in-first-out (FIFO) buffer;
   if the first mn×1 halftone segment does not match any halftone segments in the FIFO buffer, (i) outputting a literal code word and a representation of the first mn×1 halftone segment, and (ii) writing the representation of the first mn×1 halftone segment to the FIFO buffer; and
   if the first mn×1 halftone segment matches a particular halftone segment in the FIFO buffer, (i) outputting a repeat code word and a repeat value, and (ii) writing at least one representation of the first mn×1 halftone segment to the FIFO buffer.

2. The method of claim 1, wherein the first mn×1 halftone segment is stored in a lookahead buffer with k−1 other mn×1 halftone segments, wherein j−1≤k of the other mn×1 halftone segments also match the particular halftone segment in the FIFO buffer, wherein the j matching halftone segments are contiguous in at least the lookahead buffer, wherein the repeat value is indicative of j, and wherein writing the at least one representation of the first mn×1 halftone segment to the FIFO buffer comprises writing j representations of the first mn×1 halftone segment to the FIFO buffer.

3. The method of claim 2, wherein the k−1 other mn×1 halftone segments are derived from other m×n pixel blocks of the image.

4. The method of claim 2, further comprising:
   removing the j matching halftone segments from the lookahead buffer.

5. The method of claim 2, wherein the repeat code word is either a short repeat code word or an extended repeat code word.

6. The method of claim 5, the method further comprising:
   comparing j to k;
   if j<k, using the short repeat code word as the repeat code word; and
   if j≥k, using the extended repeat code word as the repeat code word.

7. The method of claim 6, wherein the extended repeat code word is the repeat code word, the method further comprising:
   after writing j representations of the first mn×1 halftone segment to the FIFO buffer, replacing at least one entry in the lookahead buffer with a second mn×1 halftone segment, wherein the second mn×1 halftone segment was derived from a second m×n pixel block of the image.

8. The method of claim 1, wherein comparing the first mn×1 halftone segment to the one or more halftone segments in the FIFO buffer comprises determining the longest consecutive extent of halftone segments in the FIFO buffer that match the first mn×1 halftone segment and any other halftone segments contiguously following the first mn×1 halftone segment.

9. The method of claim 1, wherein the first mn×1 halftone segment matches the particular halftone segment in the FIFO buffer, the method further comprising:
outputting a repeat position that is indicative of a location of the particular halftone segment in the FIFO buffer.

10. The method of claim 1, wherein each cell of the m×n halftone matrix contains i−1 threshold values, wherein the i−1 threshold values define i pixel value ranges, and wherein each cell of the first m×n halftone version of the first m×n pixel block contains a $\log_2(i)$-bit value.

11. The method of claim 10, wherein determining the first m×n halftone version of the first m×n pixel block comprises, for each particular cell in the first m×n pixel block:
determining a particular pixel value of the particular cell in the first m×n pixel block;
determining that one of the i pixel value ranges in a particular cell of the m×n halftone matrix encompasses the particular pixel value, wherein the particular cell in the first m×n pixel block corresponds to the particular cell of the m×n halftone matrix; and
writing, to a particular cell of the first m×n halftone version of the first m×n pixel block, a $\log_2(i)$-bit value that represents the determining one of the i pixel value ranges.

12. The method of claim 1, wherein determining the first m×n halftone version of the first m×n pixel block comprises tiling the m×n halftone matrix over the image such that starting positions of vertically contiguous tiles of the m×n halftone matrix are offset by q pixels, the method further comprising:
appending r 1×n padding pixel columns to the rightmost column of the image.

13. The method of claim 12, wherein p is the width of the image in pixels before appending the r 1×n padding pixel columns, and wherein r is m−(p−q) mod m.

14. An article of manufacture including a non-transitory computer-readable medium, having stored thereon program instructions that, upon execution by a computing device, cause the computing device to perform operations comprising:
based on an m×n halftone matrix and a first m×n pixel block of an image, determining, by a computing device, a first m×n halftone version of the first m×n pixel block;
performing an n-way interleave on rows of the first m×n halftone version of the first m×n pixel block to create a first mn×1 halftone segment;
comparing the first mn×1 halftone segment to one or more halftone segments in a first-in-first-out (FIFO) buffer;
if the first mn×1 halftone segment does not match any halftone segments in the FIFO buffer, (i) outputting a literal code word and a representation of the first mn×1 halftone segment, and (ii) writing the representation of the first mn×1 halftone segment to the FIFO buffer; and
if the first mn×1 halftone segment matches a particular halftone segment in the FIFO buffer, (i) outputting a repeat code word and a repeat value, and (ii) writing at least one representation of the first mn×1 halftone segment to the FIFO buffer.

15. The article of manufacture of claim 14, wherein the first mn×1 halftone segment is stored in a lookahead buffer with k−1 other mn×1 halftone segments, wherein j−1≤k of the other mn×1 halftone segments also match the particular halftone segment in the FIFO buffer, wherein the j matching halftone segments are contiguous in the lookahead buffer, wherein the repeat value is indicative of j, and wherein writing the at least one representation of the first mn×1 halftone segment to the FIFO buffer comprises writing j representations of the first mn×1 halftone segment to the FIFO buffer.

16. The article of manufacture of claim 14, wherein the repeat code word is either a short repeat code word or an extended repeat code word.

17. The article of manufacture of claim 16, the method further comprising:
comparing j to k;
if j<k, using the short repeat code word as the repeat code word; and
if j≥k, using the extended repeat code word as the repeat code word.

18. The article of manufacture of claim 16, wherein the extended repeat code word is the repeat code word, the method further comprising:
after writing j representations of the first mn×1 halftone segment to the FIFO buffer, replacing at least one entry in the lookahead buffer with a second mn×1 halftone segment, wherein the second mn×1 halftone segment was derived from a second m×n pixel block of the image.

19. A computing device comprising:
a processor;
data storage; and
program instructions, stored in the data storage, that upon execution by the processor cause the computing device to perform operations comprising:
based on an m×n halftone matrix and a first m×n pixel block of an image, determining, by a computing device, a first m×n halftone version of the first m×n pixel block;
performing an n-way interleave on rows of the first m×n halftone version of the first m×n pixel block to create a first mn×1 halftone segment;
comparing the first mn×1 halftone segment to one or more halftone segments in a first-in-first-out (FIFO) buffer;
if the first mn×1 halftone segment does not match any halftone segments in the FIFO buffer, (i) outputting a literal code word and a representation of the first mn×1 halftone segment, and (ii) writing the representation of the first mn×1 halftone segment to the FIFO buffer; and
if the first mn×1 halftone segment matches a particular halftone segment in the FIFO buffer, (i) outputting a repeat code word and a repeat value, and (ii) writing at least one representation of the first mn×1 halftone segment to the FIFO buffer.

* * * * *